(12) United States Patent
Ooka

(10) Patent No.: US 9,179,262 B2
(45) Date of Patent: *Nov. 3, 2015

(54) PERSONAL DIGITAL ASSISTANT WITH MULTIPLE ACTIVE ELEMENTS FOR GUIDING USER TO MOVING TARGET

(71) Applicant: SONY MOBILE COMMUNICATIONS, INC., Tokyo (JP)

(72) Inventor: Tatsuya Ooka, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/598,810

(22) Filed: Jan. 16, 2015

(65) Prior Publication Data

US 2015/0126231 A1    May 7, 2015

Related U.S. Application Data

(63) Continuation of application No. 13/708,010, filed on Dec. 7, 2012, now Pat. No. 8,977,297.

(60) Provisional application No. 61/581,121, filed on Dec. 29, 2011.

(51) Int. Cl.
*H04W 4/02* (2009.01)
*H04W 68/00* (2009.01)
(Continued)

(52) U.S. Cl.
CPC ........... *H04W 4/026* (2013.01); *G01C 21/3438* (2013.01); *G01C 21/3652* (2013.01);
(Continued)

(58) Field of Classification Search
CPC ...................................... H04W 4/02
USPC .......... 455/456.1, 456.2, 456.3, 456.5, 456.6, 455/457
See application file for complete search history.

(56) References Cited

U.S. PATENT DOCUMENTS

2002/0111737 A1    8/2002 Hoisko
2003/0060976 A1    3/2003 Sato et al.
(Continued)

FOREIGN PATENT DOCUMENTS

EP    1 220 179 A2    7/2002
EP    1 298 621 A2    4/2003
(Continued)

OTHER PUBLICATIONS

URL:http://office.microsoft.com/ja-jp/powerpoint-help/HP005274595.aspx?CTT=1, 1 page (no English translation).
(Continued)

*Primary Examiner* — Christopher M Brandt
(74) *Attorney, Agent, or Firm* — Oblon, McClelland, Maier & Neustadt, L.L.P.

(57) ABSTRACT

An information processing apparatus that detects a first location of the information processing apparatus; receives information representing a target location from a target information processing apparatus; detects a target direction from the first location toward the target location; detects an orientation of a casing of the information processing apparatus; calculates an angular difference between the target direction and the orientation of the casing; determines a perceptual strength of each of a plurality of active elements disposed in different locations on or within the casing based on the angular difference; and controls each of the plurality of active elements based on the perceptual strengths.

19 Claims, 21 Drawing Sheets

(51) Int. Cl.

| | | |
|---|---|---|
| *G08G 1/005* | (2006.01) | |
| *G08G 1/0967* | (2006.01) | |
| *G08G 1/00* | (2006.01) | |
| *H04W 4/20* | (2009.01) | |
| *G01C 21/34* | (2006.01) | |
| *G01C 21/36* | (2006.01) | |
| *G01S 5/00* | (2006.01) | |
| *H04M 1/725* | (2006.01) | |

(52) U.S. Cl.
CPC .............. *G01S5/0072* (2013.01); *G08G 1/005* (2013.01); *G08G 1/096791* (2013.01); *G08G 1/205* (2013.01); *H04M 1/72572* (2013.01); *H04W 4/206* (2013.01); *H04W 68/00* (2013.01)

(56) References Cited

U.S. PATENT DOCUMENTS

| | | |
|---|---|---|
| 2007/0100539 A1 | 5/2007 | Jang et al. |
| 2008/0120029 A1 | 5/2008 | Zelek et al. |
| 2010/0130236 A1 | 5/2010 | Sivadas et al. |
| 2010/0248745 A1 | 9/2010 | Ozawa et al. |
| 2010/0323657 A1 | 12/2010 | Barnard et al. |
| 2011/0137759 A1 | 6/2011 | Wellington et al. |
| 2011/0148695 A1 | 6/2011 | Mizuochi |
| 2012/0083285 A1 | 4/2012 | Shatsky et al. |
| 2012/0083963 A1 | 4/2012 | Sato et al. |
| 2012/0150431 A1 | 6/2012 | Ooka |
| 2012/0268249 A1 | 10/2012 | Kansal et al. |
| 2013/0179780 A1 | 7/2013 | Ooka |
| 2014/0324331 A1 | 10/2014 | Ooka |

FOREIGN PATENT DOCUMENTS

| | | |
|---|---|---|
| EP | 2 042 835 A2 | 4/2009 |
| EP | 2 463 628 A2 | 6/2012 |
| JP | 2001-025510 | 1/2001 |
| JP | 2001/141478 A | 5/2001 |
| JP | 2002/168647 | 6/2002 |
| JP | 2005/227168 | 8/2005 |
| JP | 2008/022491 | 1/2008 |
| JP | 2008/180652 | 8/2008 |
| JP | 2010/250783 | 11/2010 |

OTHER PUBLICATIONS

Extended European Search Report issued Apr. 19, 2013 in patent application No. 12198222.7.

PERSONAL DIGITAL ASSISTANT WITH MULTIPLE ACTIVE ELEMENTS FOR GUIDING USER TO MOVING TARGET

CROSS REFERENCE TO RELATED APPLICATION

This application is a continuation of U.S. application Ser. No. 13/708,010, filed Dec. 7, 2012, the entire contents of which is incorporated herein by reference. U.S. Ser. No. 13/708,010 claims the benefit of priority under 119(e) of U.S. Provisional Patent Application Ser. No. 61/581,121 filed on Dec. 29, 2011.

BACKGROUND

1. Field of the Disclosure

The present disclosure relates to a personal digital assistant, and specifically relates to a personal digital assistant including a perceptual active unit including active elements such as vibration elements.

2. Field of the Disclosure

There are various manners in which people rendezvous outdoors, at event sites, and so forth. A conventional typical form of rendezvous is such wherein people decide on a rendezvous time and place using letters, phone, or the like beforehand, and the people travel to this place in accordance with the time thereof.

However, with such a manner of rendezvous, there has been a problem in that, in the event that delay due to some sort of hindrance has occurred, or there has been a mistake regarding the location, or the like, meeting up with a partner at scheduled time and place is difficult. For example, there has been inconsistency in arrival time at a rendezvous place due to traffic conditions. Also, in the event of many people existing at a rendezvous place, it may be difficult for people walking while looking for a partner to notice the presence of each other.

Though it can be conceived that the people might come closer to each other by communicating using cellular phones, it is not necessarily easy for the people to accurately orally inform the partner of the current locations of each other or rendezvous location, or to recognize these.

On the other hand, there have been proposed various services taking advantage of multifunction cellular phone terminals called as smartphones which have come into widespread use in recent years. In general, various sensors for measuring the state of a terminal or user are mounted on multifunction cellular phone terminals, such as a GPS (Global Positioning System) for obtaining the current location, a geomagnetic sensor for detecting a tilt (direction) as to the terrestrial magnetism of a terminal, and so forth.

In association with the problems such as the above, with Japanese Unexamined Patent Application Publication No. 2005-227168 (PTL 1) for example, there has been proposed a system which takes advantage of location information according to the GPS functions of personal digital assistants which the users possess to reorient or inform the optimal rendezvous place in real time, thereby performing assistance for rendezvous.

Also, with Japanese Unexamined Patent Application Publication No. 2008-22491 (PTL 2), there has been proposed a system which has applied a method wherein of two wireless devices which can communicate with each other, one of the wireless devices (master terminal device) confirms the existence of the other wireless device (slave terminal device), to detection of a missing child. More specifically, a slave terminal device which a child possesses receives the request signal from the master terminal device which a parent possesses, and estimates distance as to the master terminal device according to the received signal strength. The slave terminal device determines the child to be "absent" in the event that the estimated distance is longer than a threshold, and responds to the master terminal device in that effect. The mater terminal device which received this response generates a warning beep.

Further, Japanese Unexamined Patent Application Publication No. 2010-250783 (PTL 3) discloses a technique wherein the current location of a pet is propagated to a cellular phone terminal using a GPS function to display a map including the current location thereof on the display screen.

SUMMARY

A system described in PTL 1 is a system for calculating driving time and an alternative route to perform information display on a map, guidance by voice, and so forth, such as a car navigation device. Information to be provided to a user in such a system is difficult for the user to intuitively understand the direction of a rendezvous partner, which is a problem. Therefore, it is not necessarily easy to directly guide the user to the direction of a rendezvous partner, and it is presumed that it will take time and trouble for the user to meet up with the partner.

It can also be conceived to apply the techniques disclosed in PTL 2 and PTL 3 to assistance for rendezvous. However, information to be provided to the user from a terminal in this case is display information on the screen of a terminal, or a warning beep alone, and accordingly, it is also difficult to intuitively recognize the direction of a rendezvous partner.

In particular, in the event of guiding a user using a display screen, the user has to keep observing a notification or map on the screen during walking to recognize a rendezvous place or partner. Visual perceptual dependency thereof may cause the user to become careless of the surroundings, becoming a nuisance to other pedestrians or risking physical harm to himself/herself. That is to say, due to the user walking (or driving a vehicle) while staring at a map displayed on the screen, the user may be involved in an accident, or may become a nuisance to other pedestrians.

There has been proposed a technique to counter such a problem, wherein direction guidance is performed using tactile sense stimulation. For example, with Japanese Unexamined Patent Application Publication No. 2002-168647 (PTL 4), a system has been proposed wherein a vibrator housed in a personal digital assistant is controlled according to difference between a target terminal direction and advancing direction. With Japanese Unexamined Patent Application Publication No. 2008-180652 (PTL 5), there has been proposed a direction providing system equipped to an electric wheelchair wherein a target terminal direction is provided to a user using an actuator which carries out tactile sense stimulation of the user's fingers, hands, elbows, or the like.

A conventional technique using tactile sense stimulation as a user interface also has the following problem.

Specifically, in the event of taking advantage of vibration for providing a direction at the terminal according to PTL 4, this terminal merely informs a user whether or not the terminal (consequently, user) faces the direction of a target, depending on presence/absence of vibration. Therefore, in the event that the user faces the target terminal direction, the user can perform confirmation thereof, but in the event the user does not face the target terminal direction, the user has to actively search the target terminal direction while changing the orientation of the terminal by the user himself/herself. Accordingly, in reality, with the user interface of direction guidance, it is inevitable that display instructions on the screen serves as the main, and vibration serves as an aid.

Also, with a system such as PTL 5, the control device of the actuator itself is great in size, and the cost for the device thereof increases.

With such a background, the present application inventor has proposed a portable navigation device whereby a destination direction can be provided to a user with a relatively simple configuration without depending on visual perception, as Japanese Patent Application No. 2011-232967. With this portable navigation device, multiple active elements are disposed in different locations of the casing, and the active elements (e.g., vibration elements) are controlled with the individual perceptual strengths (vibration strengths), thereby allowing the user to sense the destination direction.

This portable navigation device is a device for guiding a user to the destination that the user has specified, and has not been a device for supporting rendezvous (or meeting up) with a moving partner.

The inventor recognizes necessity to inform a user the direction of a moving target terminal with a relatively simple configuration without depending on visual perception.

According to an embodiment of the present disclosure, there is provided an information processing apparatus that detects a first location of the information processing apparatus; receives information representing a target location from a target information processing apparatus; detects a target direction from the first location toward the target location; detects an orientation of a casing of the information processing apparatus; calculates an angular difference between the target direction and the orientation of the casing; determines a perceptual strength of each of a plurality of active elements disposed in different locations on or within the casing based on the angular difference; and controls each of the plurality of active elements based on the perceptual strengths.

According to such a configuration, a user of the information processing apparatus can be guided to the direction of a target terminal with a relatively simple configuration without depending on visual perception. Additionally, the direction of the target information processing apparatus can successively be updated even if a partner who possesses the target terminal moves. Thus, the user can be allowed to intuitively recognize the direction of the target information processing apparatus without depending on visual perception, and to perform assistance for rendezvous between users. At this time, in the event of the target side also including the same configuration, both who rendezvous can move while simultaneously searching for the partner's device.

In particular, assistance is facilitated for smooth rendezvous on a complicated terrain or crowded place. Also, this can be used for prevention of a missing child by a parent and a child possessing a terminal.

DETAILED DESCRIPTION

Description will be made below in detail regarding an embodiment of the present disclosure while referencing the drawings.

The embodiment of the present disclosure is, by implementing active elements which affect on a person's perception other than visual perception (e.g., tactile perception or the like) in a personal digital assistant, to guide a user of the personal digital assistant to the direction of a target terminal via this perception.

Figure 1:
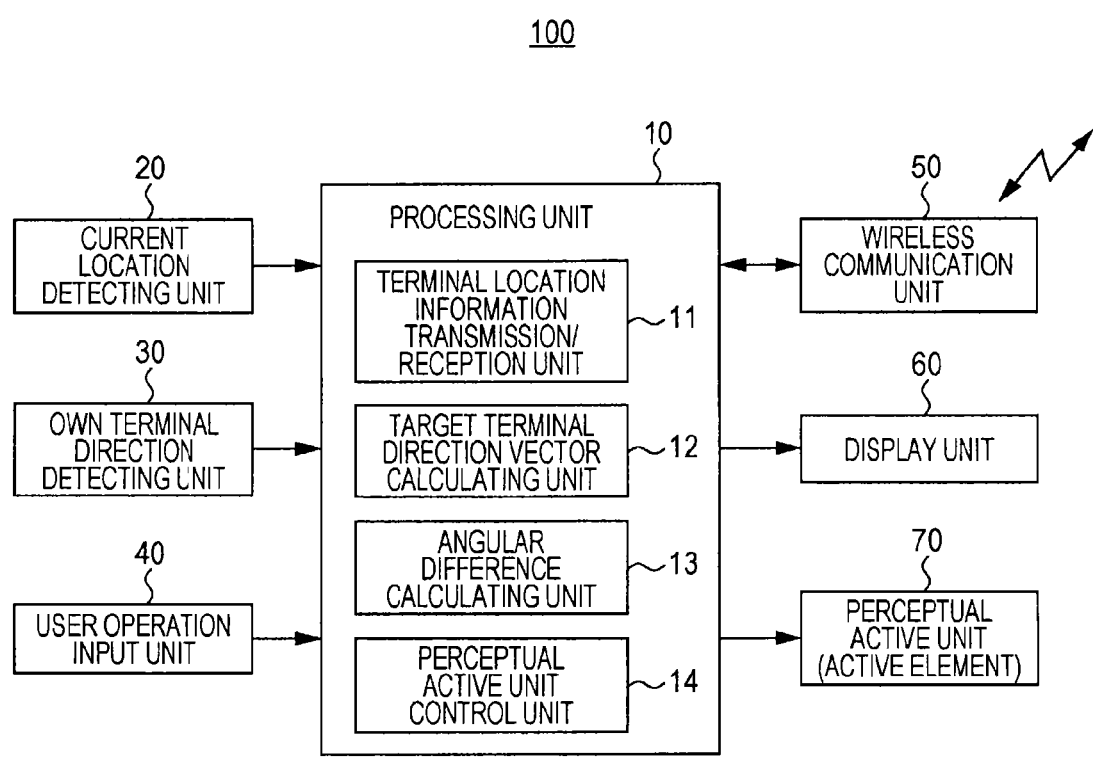
FIG. 1 is a block diagram illustrating the principal functions of a personal digital assistant according to an embodiment of the present disclosure.

FIG. 1 is a block diagram illustrating the principal functions of the personal digital assistant according to the present embodiment. Hereafter, the personal digital assistant will also simply be referred to as a terminal.

The personal digital assistant 100 is, for example, a multifunction cellular phone terminal, and includes a processing unit 10, a current location detecting unit 20, an own terminal direction detecting unit 30, a user operation input unit 40, a wireless communication unit 50, a display unit 60, and a perceptual active unit 70. However, the personal digital assistant 100 is not restricted to a multifunction cellular phone terminal, and may be a portable arbitrary terminal device.

The processing unit 10 includes a central processing unit (CPU), and executes the entire control of the personal digital assistant 100 and necessary processing. For example, in the event that there have been received instructions for starting guidance with a particular operation mode according to the present embodiment from the user operation input unit 40 by a user, the processing unit 10 executes predetermined control and necessary processing. The particular operation mode mentioned here is an operation mode wherein even if a rendezvous partner moves, a personal digital assistant which the partner thereof possesses is searched as a target terminal, thereby supporting rendezvous (meeting up) with the partner. With the present embodiment, this operation mode will be referred to as target terminal search mode.

More specifically, the processing unit 10 includes a terminal location information transmission/reception unit 11, a target terminal direction vector calculating unit 12, an angular difference calculating unit 13, a perceptual active unit control unit 14, and so forth as the principal function units according to the present embodiment. The processing that each function unit of these bears will be described later.

Figure 3:
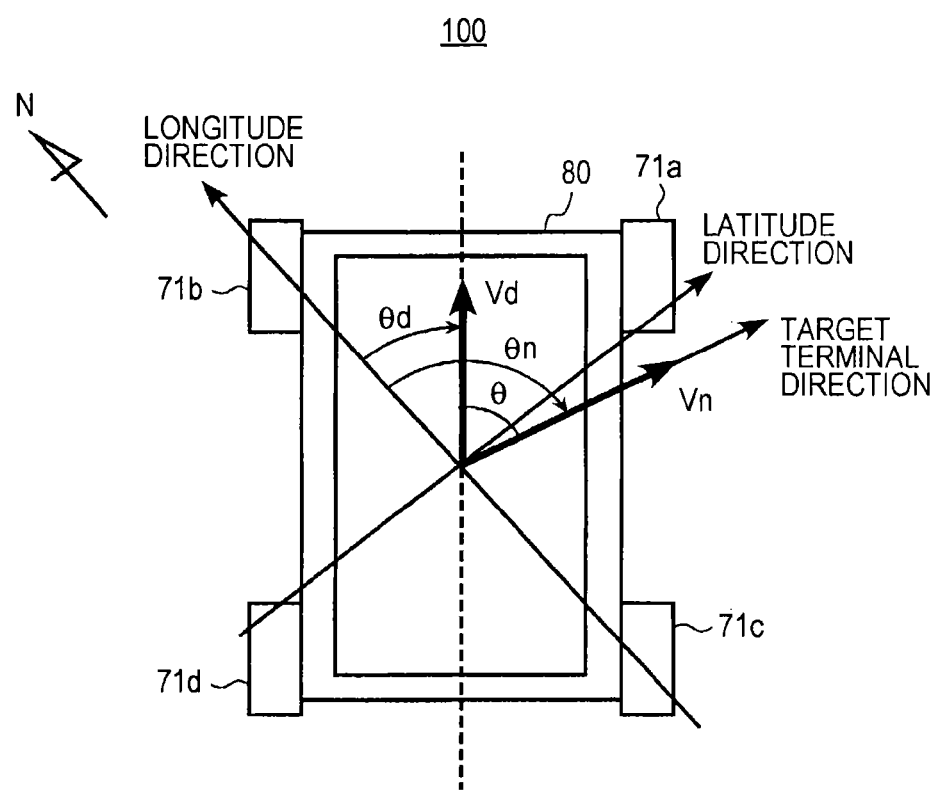
FIG. 3 is a diagram illustrating a relation between the own terminal direction (vector) Vd of a personal digital assistant grasped by a user, a target terminal direction (vector) Vn, and an angle θ.

The units illustrated in FIG. 1 are housed or implemented a casing 80 (FIG. 3).

The current location detecting unit 20 detects the current location of the personal digital assistant 100, e.g., the latitude and longitude of the location thereof on the earth. A location detector such as a GPS reception unit or the like can be used as the current location detecting unit 20. However, the current location detecting unit according to an embodiment of the present disclosure is not restricted to a GPS reception unit.

The own terminal direction detecting unit 30 detects the facing direction of the casing, i.e., the own terminal direction serving as a direction where the tip in the longitudinal direction of the personal digital assistant 100 faces. Specifically, the own terminal direction detecting unit 30 can obtain a direction where the tip of the terminal faces as to a reference direction such as a longitude line (or latitude line) or the like using a bearing detector, for example, such as a geomagnetic sensor, as the own terminal direction. Generally, in the event that the user uses the personal digital assistant 100, the user grasps the casing in a state in which the longitudinal direction of the casing thereof somewhat inclines from the vertical direction to view the display screen of the display unit 60. The user does not necessarily have to view the screen at the time of direction guidance using the perception according to an embodiment of the present disclosure, and accordingly, it can also be conceived that the user grasps the casing in the horizontal state (or state close to the horizontal state). In either case, in such a state, the own terminal direction can be recognized by the own terminal direction detecting unit 30. In the event that a vector representing the own terminal direction is not on the horizontal plane, the own terminal direction may be taken as the direction obtained by projecting this vector on the horizontal plane. In this case, an attitude sensor (not illustrated) such as an acceleration sensor or the like for detecting the attitude of the terminal (inclination of the casing as to the vertical direction) may additionally be employed.

The user operation input unit 40 is a unit for performing detection of an operation as to the terminal by the user (input of instructions or information, and so forth). The user operation input unit 40 is configured of optional input devices such as an operation keys, touch panel, and so forth.

The wireless communication unit 50 is a device for performing wireless communication, and an acquainted communication device such as a cellular phone communication unit (e.g., 3G (3rd Generation), etc.) a wireless LAN (e.g., WiFi, etc.), Bluetooth (registered trademark), or the like can be used as the wireless communication unit 50.

The display unit 60 is a display device, for example, such as a liquid crystal display device (LCD: Liquid Crystal Display) or the like, for displaying information such as text, an image, or the like on the display screen.

The perceptual active unit 70 is a unit for providing information to the user using active elements which affect on a person's perception other than visual perception. The perceptual active unit 70 individually controls multiple active elements, thereby providing information to the user who grasps the casing via this perception. With the present embodiment, four (at least three) active elements are disposed in different locations on the casing or within the casing (the four corners of the casing in the present embodiment) as the perceptual active unit 70. For example, the direction of a personal digital assistant which a rendezvous partner possesses serving as the search target is informed to the user by driving of these active elements. Hereafter, "personal digital assistant serving as the search target" will be referred to as target terminal. Also, the direction of the target terminal will be referred to as target terminal direction.

The processing of each function unit which the processing unit 10 bears is as follows.

The terminal location information transmission/reception unit 11 is a unit for the personal digital assistant which the user possesses performing transmission/reception of information with the target terminal via a wireless network using the wireless communication unit 50. Information to be transmitted/received is more specifically information representing the current location of the personal digital assistant which the user possesses (terminal location information). The terminal location information may directly be exchanged between personal digital assistants which mutually perform communication, or may be exchanged via an intermediate device such as a server.

The target terminal direction vector calculating unit 12 makes up a target terminal direction detecting unit for detecting a target terminal direction from the current location of the user of the personal digital assistant toward the current location of the target terminal. Specifically, the target terminal direction vector calculating unit 12 obtains a target terminal direction vector with the current location of the personal digital assistant 100 as a starting point based on the current location of the personal digital assistant 100 of the user himself/herself obtained from the current location detecting unit 20, and the current location of the target terminal obtained at the terminal location information transmission/reception unit 11.

The angular difference calculating unit 13 obtains angular difference between the target terminal direction and the own terminal direction, i.e., an angle made up of the target terminal direction vector calculated at the target terminal direction vector calculating unit 12, and the own terminal direction of the terminal 100 from the own terminal direction detecting unit 30.

The perceptual active unit control unit 14 is a unit for determining the perceptual strength of each of at least three active elements based on the angular difference calculated from the angular difference calculating unit 13, and controlling at least the three active elements with the perceptual strengths.

Figure 2:
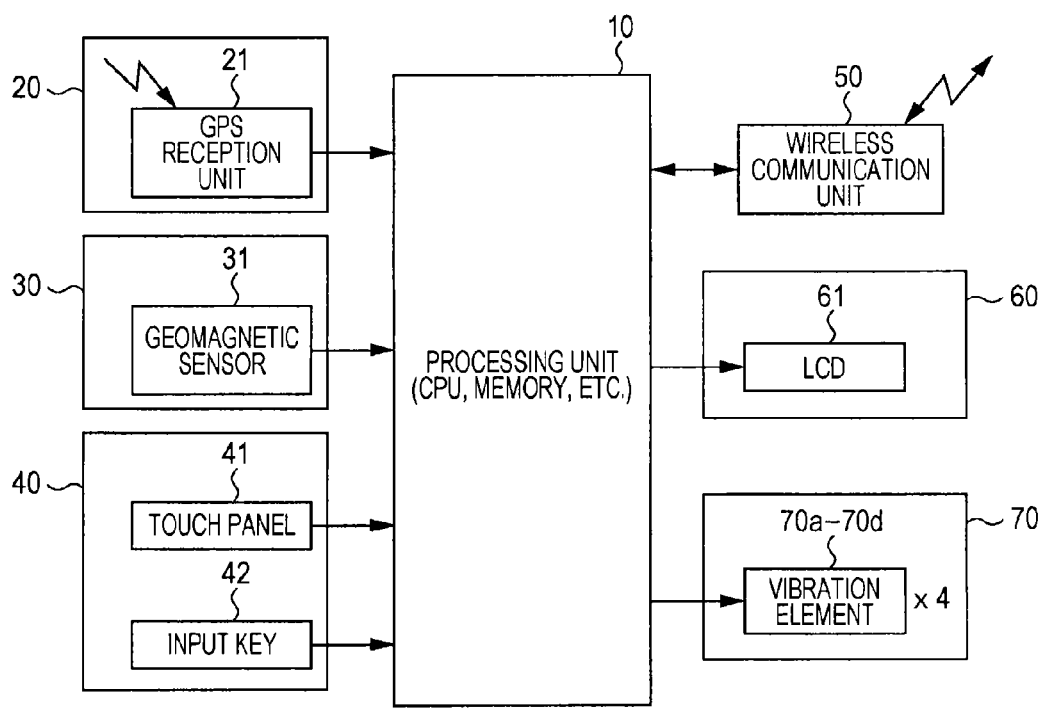
FIG. 2 is a block diagram illustrating a hardware configuration example of the personal digital assistant illustrated in FIG. 1.

FIG. 2 is a block diagram illustrating a hardware configuration example of the personal digital assistant 100 illustrated in FIG. 1. Description will be made below regarding an example employing, for example, vibration PS (Phantom Sensation) that is a vibration perceptual property as a kind of a person's perceptual properties. The vibration PS mentioned here is a phenomenon wherein in the event of having applied vibration stimulation to multiple points on the skin, the person perceives these at the middle point thereof as one fused vibration, and a location to perceive a fused vibration is also changed by changing the ratios of the vibration strengths. The vibration PS may be induced using electric stimulation such as Japanese Unexamined Patent Application Publication No. 2001-025510 (PTL 6).

With the embodiment of the present disclosure, the phenomenon of such vibration PS is used to correspond the location of the vibration PS induced within the palm of the user by four vibration elements disposed in different locations of the casing of the personal digital assistant to a direction where the target terminal exists.

The processing unit 10 can be configured of, in addition to the above central processing unit (CPU), memory (storage device), input/output devices, and so forth. A program that the CPU executes and various types of data are saved in the memory. The memory is also used as the work region of the CPU, and a temporal saved region for data.

The current location detecting unit 20 can be configured of a GPS reception unit 21. The GPS reception unit 21 has a function for detecting the current location (latitude and longitude) of the personal digital assistant 100 in which the GPS reception unit 21 is implemented by receiving radio waves (GPS satellite signals) from multiple satellites.

The own terminal direction detecting unit 30 can be configured of a geomagnetic sensor 31, for example. The orientation of the geomagnetism (e.g., north direction) in the current location can be detected by the geomagnetic sensor 31.

The user operation input unit 40 can be configured of the touch panel 41 and input key 42. The touch panel 41 is a unit for detecting a direct operation of the user according to change of electrostatic capacity or the like by touch such as the user's finger or the like. For example, scrolling in an arbitrary direction of a displayed content, or the like is performed based on the operation amount thereof. The touch panel 41 preferably includes a touch input area overlapped with the display screen of the display unit 60. The input key 42 can be configured of multiple keys such as a numeric key-pad, control keys, direction instruction keys, and so forth. The input key 42 is not restricted to a hardware key made up of a physical key, and may include a software key displayed on the touch panel 41.

A display device, for example, such as the liquid crystal display device (LCD) 61 can be used as the display unit 60. However, the display unit 60 is not restricted to an LCD.

With this example, four vibration elements 70a through 70d are employed as the active elements making up the perceptual active unit 70. The frequency of the vibration of each vibration element is basically a common predetermined frequency (e.g., around 200 Hz). As for vibration elements in the present Specification, arbitrary devices which generate vibration are employed. Though not particularly restricted, vibration motors, piezoelectric elements, linear actuators, and so forth may be included therein.

With the present embodiment, the ratios of the vibration strengths of the vibration elements 70a through 70d installed in the four corners of the terminal (casing 80) are determined. The vibration elements are driven and controlled according to the determined vibration strength ratios. The vibration strengths of the four vibration elements 70a through 70d are changed, thereby inducing the vibration PS on the palm of the user who holds the personal digital assistant. A specific example of the vibration strength ratios will be described later.

Though not illustrated, the personal digital assistant 100 may further include components which a common cellular phone terminal includes, such as a speaker for outputting audio signals as sound or voice, a microphone which converts sound and voice into audio signals, and so forth.

FIG. 3 illustrates a relation between an own terminal direction (vector) Vd representing the facing direction of the personal digital assistant 100 (the direction of the tip thereof) grasped by the user, a target terminal direction (vector) Vn, and an angle θ. In this drawing, four vibration elements 71a, 71b, 71c, and 71d making up the perceptual active unit 70 are, as described above, disposed in four corners of the casing 80 having a generally rectangular parallelepiped shape of the personal digital assistant 100. In the drawing, the vibration elements are exaggeratingly illustrated in a format protruding from the casing 80 to the outside. In reality, the vibration elements do not have to protrude outside in this way.

The target terminal direction vector Vn is determined from the current location (latitude and longitude) obtained from the GPS reception unit 21 based on the current location (latitude and longitude) of the target terminal. As described above, the angle θ is angular difference between an angle θn made up of the target terminal direction vector Vn and the longitude line (north direction), and an angle θd made up of the own terminal direction Vd obtained by the geomagnetic sensor 31 and the longitude line (north direction).

According to FIG. 4, with the present embodiment, description will be made regarding a relation between both in the target terminal search modes of personal digital assistants which two users, who rendezvous outdoors or at an event site or the like, possess.

In the target terminal search mode, a first user's terminal 101, and a second user's terminal 102 each search the target terminal direction with the partner's terminal as the target terminal while continuously confirming the current location of the own terminal, and the current location of the partner's terminal. As a result of this search, the terminal 101 individually controls four vibration elements 71a through 71d thereof based on the angle θ1 of the target terminal direction vector Vn1 of the target terminal 102 with the own terminal direction Vd1 as a reference. Similarly, the terminal 102 individually controls four vibration elements 72a through 72d thereof based on the angle θ2 of the target terminal direction Vn2 of the terminal 101 with the own terminal 102 thereof as a reference.

More specifically, with each of the terminals, the target terminal direction vector calculating unit 12 updates the target terminal direction Vn based on information representing the target terminal location of the partner terminal successively received. Also, the wireless communication unit 50 successively transmits information representing the current location detected by the current location detecting unit 20 to the partner terminal. The own terminal direction detecting unit 30 successively updates the own terminal direction Vd. The angular difference calculating unit 13 updates the angle θ that is the angular difference between the successively updated target terminal direction Vn and own terminal direction Vd. The perceptual active unit control units 14 of both terminals 101 and 102 successively update control of the four active elements 71a through 71d and 72a through 72d based on the updated angles θ1 and θ2, respectively.

Figure 5:
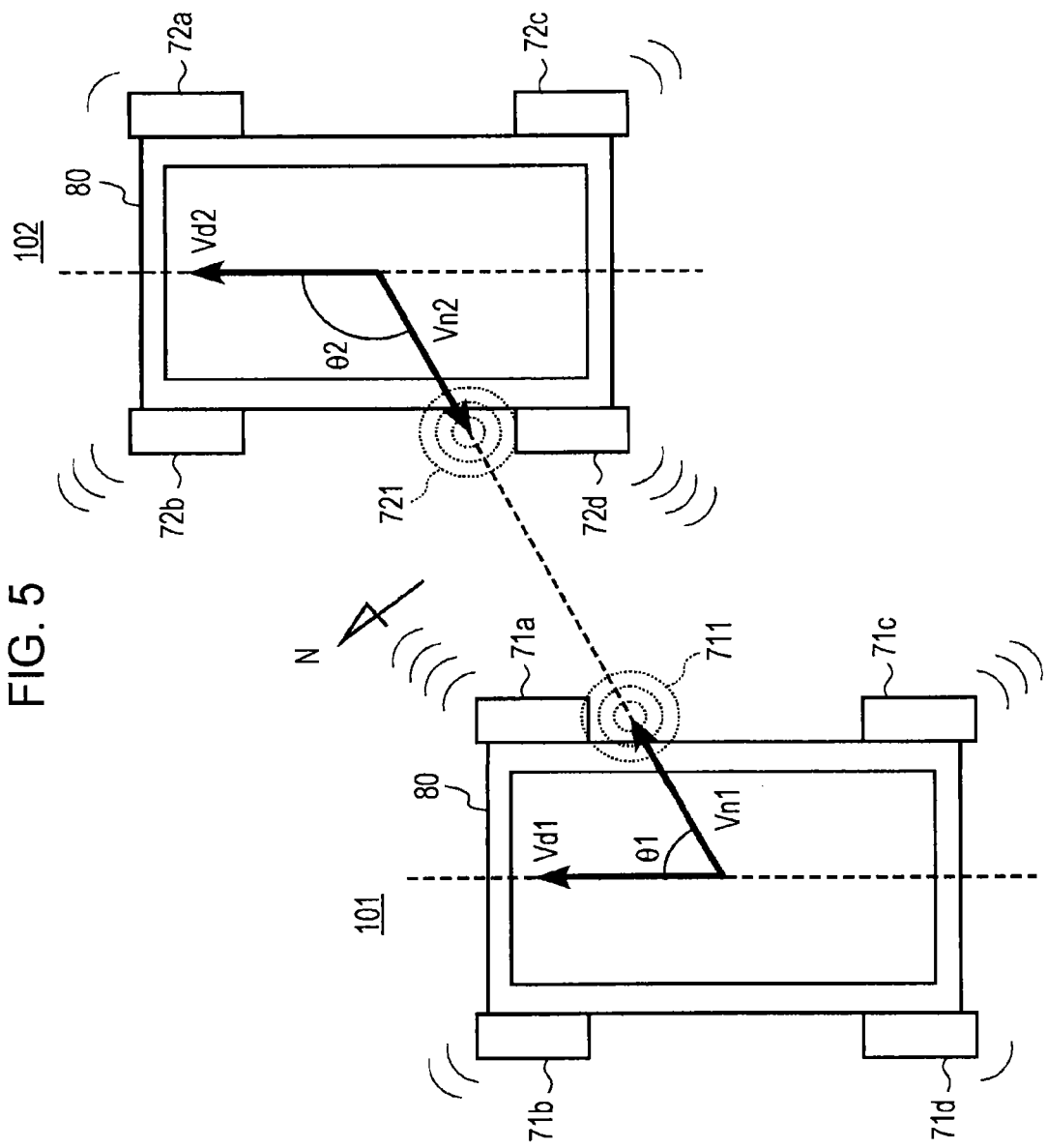
FIG. 5 is another explanatory diagram of a particular operation mode of a personal digital assistant according an embodiment of the present disclosure.

Thus, as illustrated in FIG. 5, the first and second users can perceive a direction where the partner currently exists with himself/herself as a reference based on the vibration of the casing of the personal digital assistant which himself/herself possesses, i.e., vibrations PS 711 and 721, respectively. At this time, the partner terminal does not have to stand still, and even if the partner terminal moves, the target terminal direction is successively updated. Accordingly, both users of the terminals 101 and 102 can come closer to a direction where the partner exists in accordance with the vibrations PS 711 and 721.

Figure 4:
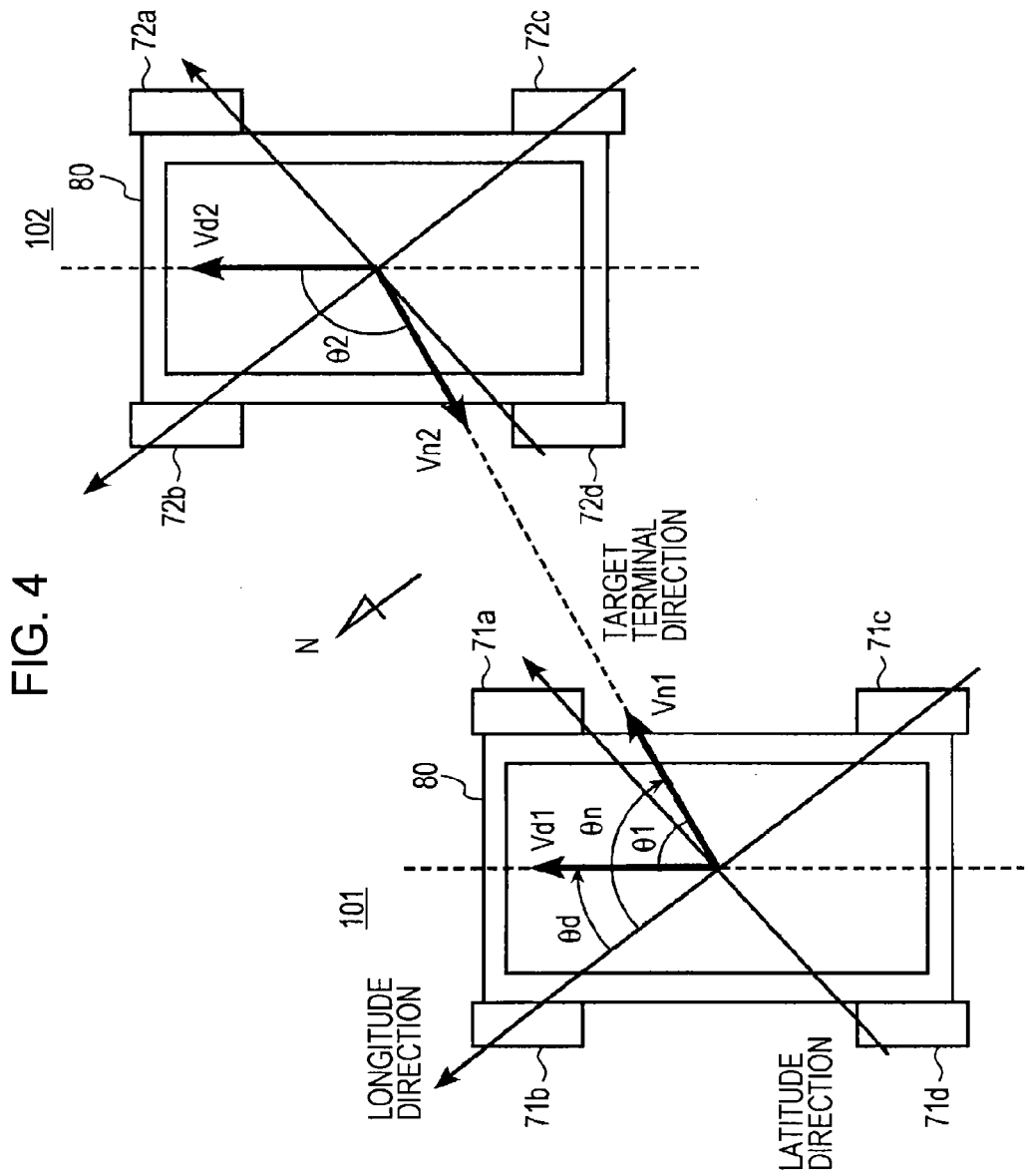
FIG. 4 is an explanatory diagram of a particular operation mode of a personal digital assistant according an embodiment of the present disclosure.

Note that, with the example illustrated in FIG. 4, the vectors Vd1 and Vd2 of both terminals 101 and 102 indicate the same direction, but may not be the same.

Ratios v1, v2, v3, and v4 of the vibration strengths of the vibration elements of the terminal 101 are obtained using the angle θ described in FIG. 3 by the following Expression (1), for example. The $v1(\theta)$ through $v4(\theta)$ of Expression (1) represent the values of mutual ratios (vibration strength ratios) so that the summation of these becomes 1. In reality, the values of the $v1(\theta)$ through $v4(\theta)$ may be multiplied by a common coefficient.

$$v1(\theta)=(\tfrac{1}{4})\times\{1+\sin\theta\sin(\pi/4)+\cos\theta\sin(\pi/4)\}$$

$$v2(\theta)=(\tfrac{1}{4})\times\{1+\sin\theta\sin(\pi/4)-\cos\theta\sin(\pi/4)\}$$

$$v3(\theta)=(\tfrac{1}{4})\times\{1-\sin\theta\sin(\pi/4)+\cos\theta\sin(\pi/4)\}$$

$$v4(\theta)=(\tfrac{1}{4})\times\{1-\sin\theta\sin(\pi/4)-\cos\theta\sin(\pi/4)\} \quad (1)$$

Note that it is acquainted that the vibration strengths of the vibration elements, and strength wherein a person perceives vibration have a logarithmic relation instead of a linear relation. Therefore, V1 may be used so that $v1(\theta)=\log(V1)$ holds. With regard $v2(\theta)$, $v3(\theta)$, and $v4(\theta)$ as well, the corresponding V2, V3, and V4 can be defined. The above can also be applied to the terminal 102.

Figure 6:
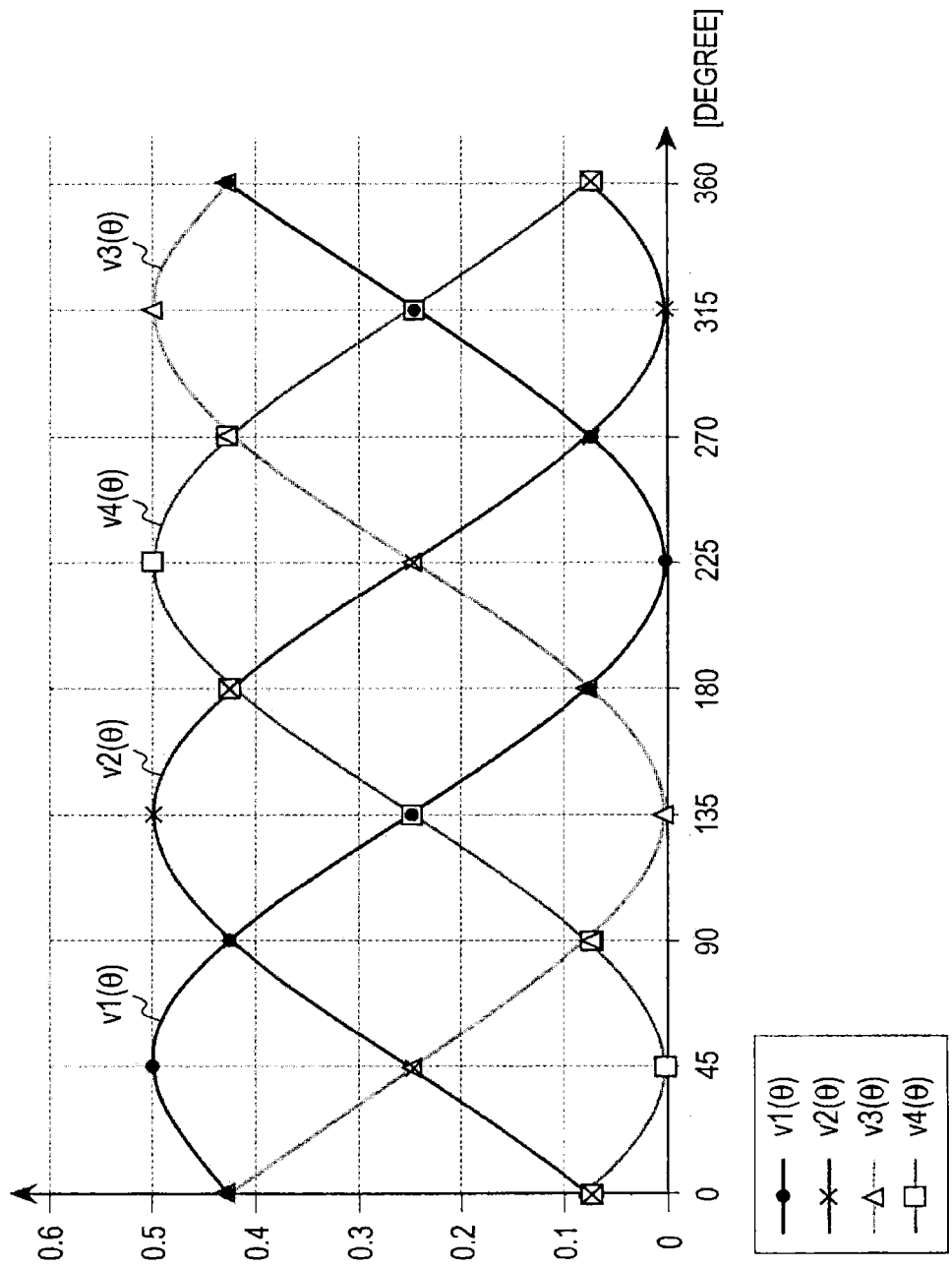
FIG. 6 is a graph representing a relation between the angle θ and the vibration strengths (vibration strength ratios) of vibration elements according to an embodiment of the present disclosure.

A relation between the angle θ and the vibration strengths (vibration strength ratios) of the vibration elements will be described with reference to FIG. 6. FIG. 6 represents the $v1(\theta)$ through $v4(\theta)$ represented with Expression (1) using a graph. The lateral axis indicates the angle θ, and the vertical axis indicates the magnitude of each of the $v1(\theta)$ through $v4(\theta)$. The angle θ indicates a range from 0 degree to 360 degrees.

In this way, according to the control of the four vibration elements 70a through 70d based on the values of the $v1(\theta)$ through $v4(\theta)$, the vibration PS 711 induced by the vibration elements 71a through 71d is obtained, as illustrated in FIG. 5. The location of the vibration PS 711 obtained as a fusion result of the vibrations of all of the vibration elements 71a through 71d is perceived by the user. That is to say, this vibration PS 711 is recognized as if only a single vibration element exists in the locations depending on the vibration strengths of the four vibration elements 71a through 71d at the palm of the user holding the personal digital assistant 101. This can also be applied to the vibration PS 721 induced by the vibration elements 72a through 72d of the terminal 102.

In the event that the user has changed the advancing direction or the facing direction of the terminal in a state holding the terminal, or in the event that the target terminal direction has been changed due to the progress of advance, the angle θ has also been changed. As a result thereof, the vibration strength ratios of the four vibration elements 70a through 70d have been changed, and the location of the vibration PS within the palm of the user has moved to the location indicating the target terminal direction. Thus, the user can recognize the target terminal direction by tactile perception without depending on visual perception.

Figure 7:
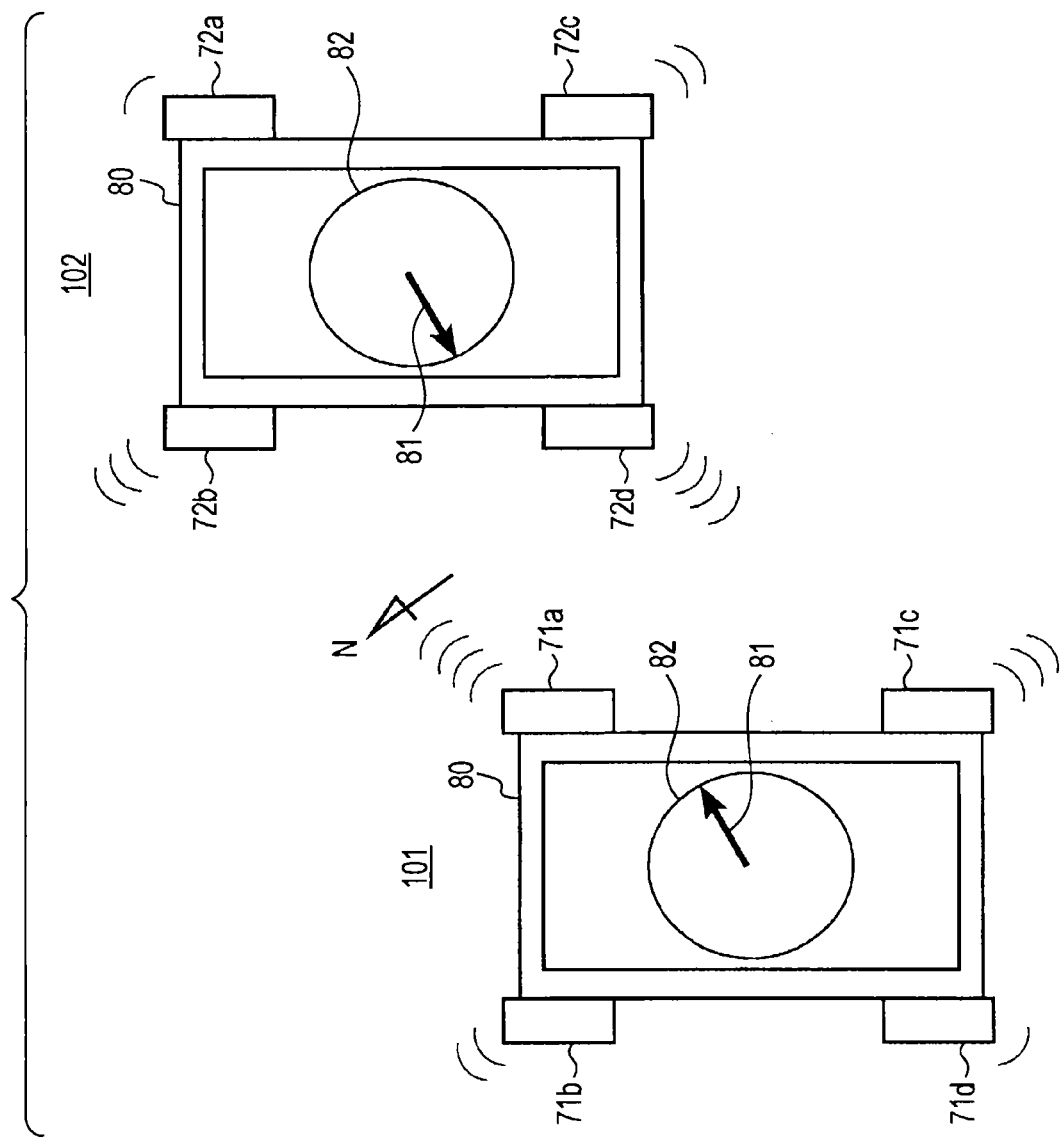
FIG. 7 is a diagram illustrating a display example on a display screen according to an embodiment of the present disclosure.

In this way, the target terminal direction is provided to the user using the vibration PS, display on the display screen is not essential, but screen display such as illustrated in FIG. 7 for example may be performed for confirmation. This example displays an indicator representing the target terminal direction on the screen of the terminal. The indicator is, with the example in the drawing, an indication object such as a compass 82 including an arrow 81 indicating the target terminal direction Vn with the generally center location of the screen as a starting point. Though the screen display 51 is not restricted to an arrow or display of a compass, in the event of display of such a simple indicator, the user can quickly recognize this at a glance. Accordingly, the user does not have to walk while staring at the terminal, which reduces a visual perceptual dependency problem such as described in a conventional technique.

Description will be made regarding a modification of display on the display screen with reference to FIGS. 8A-8C.

Figure 8A:
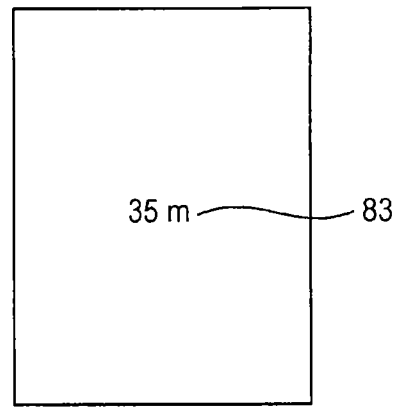
FIGS. 8A-8C are diagrams for describing a modification of display on the display screen.
Figure 8B:
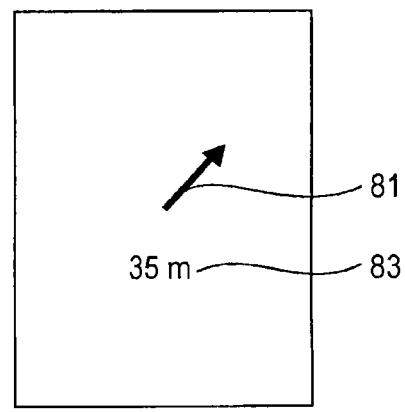
Figure 8C:
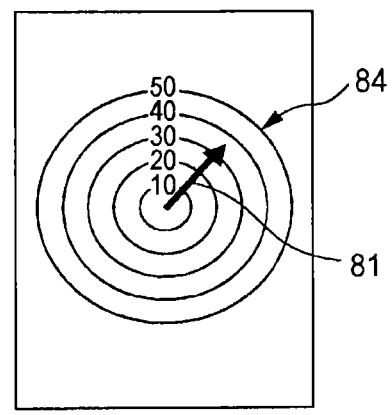

In FIG. 8A, a text string 83 including a numeric value representing the current distance from the own terminal to the target terminal is displayed on the display screen. FIG. 8B illustrates a display example wherein an arrow 81 representing the target terminal direction is displayed along with the text string 83 including a numeric value representing distance. FIG. 8C illustrates a display example illustrating (changing the length of the arrow according to the distance) distance with the length of the arrow 81 of which the starting point is disposed in a concentric circle 84 representing distance as the arrow 81 representing the target terminal direction. With the example in FIG. 8C, the distance is illustrated with the length of the arrow 81 instead of a text string, whereby the user can intuitively recognize the distance and change thereof.

A modification of the embodiment wherein the current distance from the own terminal to the target terminal is displayed will be described later with reference to FIG. 19.

Hereafter, processing for executing the personal digital assistant according to the present embodiment will be described.

FIG. 9 through FIG. 18 illustrate flowcharts representing processing that the personal digital assistant executes.

Figure 9:
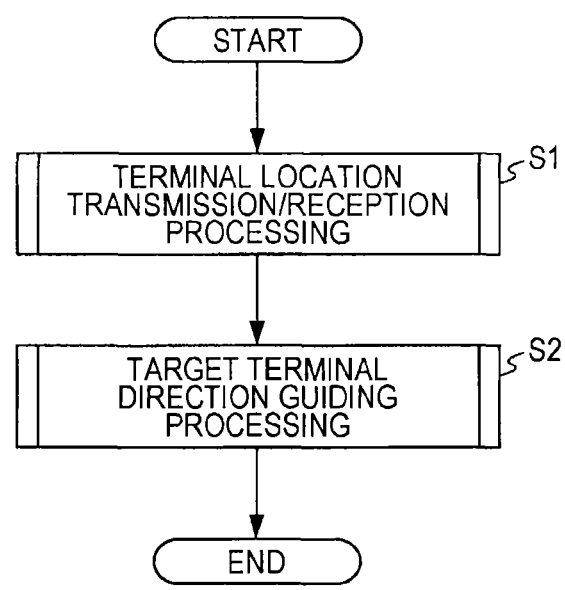
FIG. 9 is a flowchart illustrating schematic processing that a personal digital assistant according to an embodiment of the present disclosure executes at the time of entering a target terminal search mode.

FIG. 9 illustrates schematic processing that the personal digital assistant executes at the time of entering the target terminal search mode in accordance with the user's instructions. The personal digital assistant first executes terminal location transmission/reception processing S1. This processing S1 includes a processing step for transmitting the current location of the own terminal, and a processing step for receiving the current location of the target terminal.

Next, the personal digital assistant executes target terminal direction guiding processing S2. This processing S2 is processing to cause the own terminal to induce the vibration PS and to guide the user to the direction of the target terminal based on the current location of the own terminal, and the current location of the target terminal.

Figure 10:
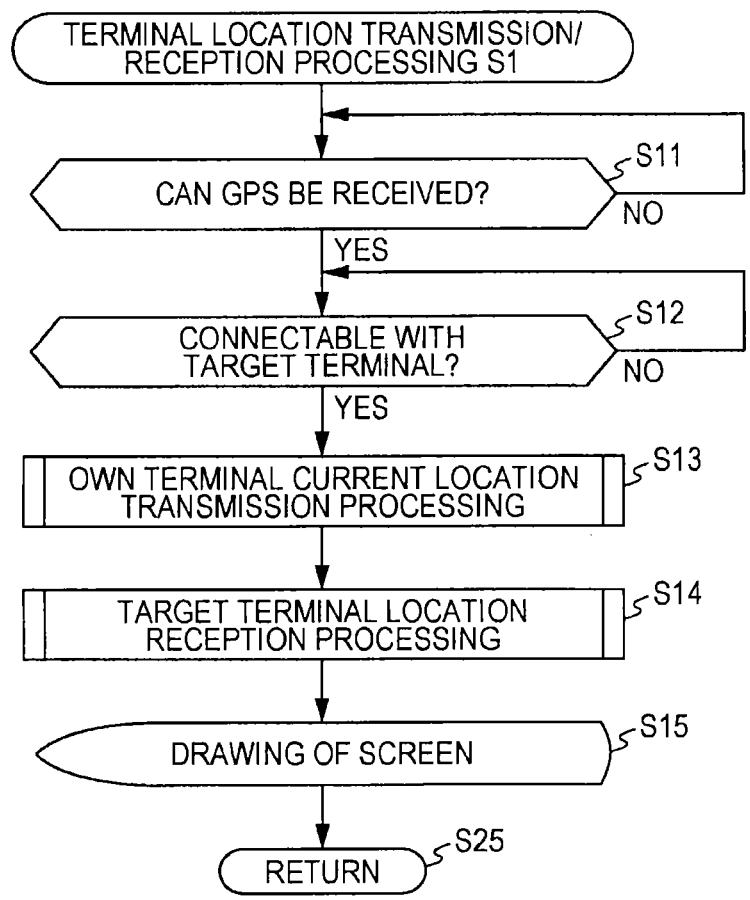
FIG. 10 is a flowchart illustrating an example of detailed processing steps of the terminal location transmission/reception processing S1 illustrated in FIG. 9.

FIG. 10 is a flowchart illustrating an example of the detailed processing steps of the terminal location transmission/reception processing S1 illustrated in FIG. 9.

The processing unit 10 of the personal digital assistant first determines whether or not the GPS reception unit 21 can currently receive GPS satellite signals, and also confirm the current location (latitude and longitude) of the own terminal (S11). In the event of failing to confirm the current location of the own terminal, the processing unit 10 waits ready until the current location of the own terminal can be confirmed. The processing unit 10 may determine that time has run out in the event that there has been received no response from the GPS reception unit 21 for a predetermined period of time, and end the processing of the target terminal search mode.

After confirming the current location of the own terminal, the processing unit 10 confirms whether or not connection to the target terminal can be performed (S12). Specifically, the processing unit 10 determines whether or not the target terminal can be found over the wireless network, and the information of the current location (latitude and longitude) of the target terminal can be received. In the event that the target terminal has not been found, the processing unit 10 waits ready until the target terminal is found. In the event that no response has been received from the wireless network for a predetermined period of time, the processing unit 10 may determine that time has run out, and end the processing in the target terminal search mode.

The order of steps S11 and S12 may be in reverse order.

Thereafter, the processing unit 10 starts own terminal current location transmission processing S13 and target terminal location reception processing S14. Similarly, the order of steps S13 and S14 may be in reverse order.

In the transmission processing S13, the processing unit 10 starts processing for repeatedly transmitting the current location of the own terminal successively to be obtained by the function of the GPS reception unit 21.

In the reception processing S14, the processing unit 10 starts processing for repeatedly receiving information of the current location (latitude and longitude) of the target terminal from the target terminal.

Note that the processing unit 10 may perform screen drawing S15 as accompanied processing. In this screen drawing S15, for example, the state of the GPS reception unit 21, or the connection state with the target terminal can be displayed as to the user.

Figure 11:
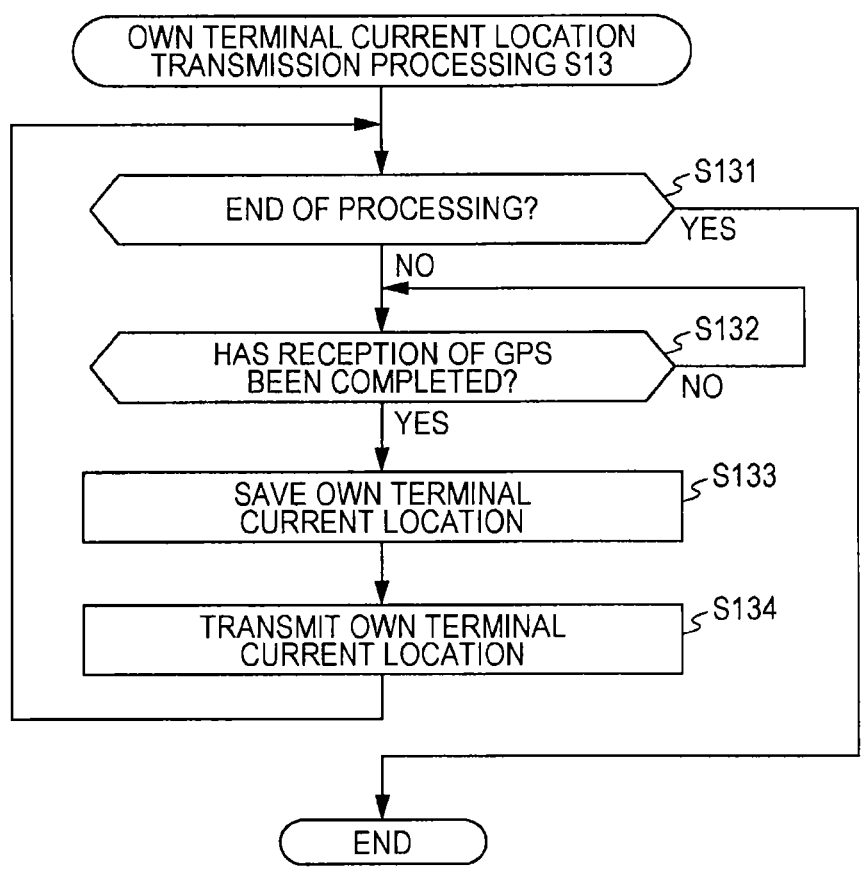
FIG. 11 is a flowchart illustrating an example of detailed processing steps of the own terminal current location transmission processing S13 illustrated in FIG. 10.

FIG. 11 is a flowchart illustrating an example of the detailed processing steps of the transmission processing S13 of the own terminal current location illustrated in FIG. 10.

This transmission processing is repeatedly executed until end processing is detected by the user's instructions in end processing S131. In the event that there have been end instructions, this processing is ended.

In GPS reception completion confirmation processing S132, determination is made whether or not reception of the current location from the GPS reception unit 21 has been completed. In the event that there has been no response from the GPS reception unit 21 for a predetermined period of time, the processing unit 10 may determine that time has run out, and end this processing.

In own terminal current location saving processing S133, the processing unit 10 saves the current location of the terminal detected from the GPS reception unit 21 in the memory.

In own terminal current location transmission processing S134, the processing unit 10 transmits the current location of the terminal detected from the GPS reception unit 21 to the target terminal.

Figure 12:
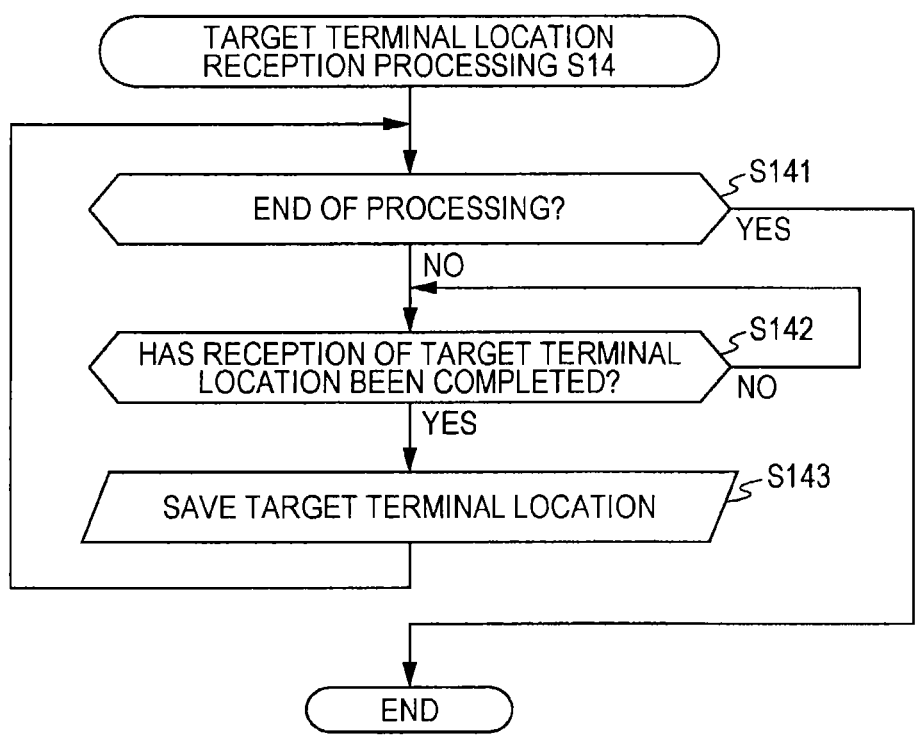
FIG. 12 is a flowchart illustrating an example of detailed processing steps of the own terminal current location reception processing S14 illustrated in FIG. 10.

FIG. 12 is a flowchart illustrating an example of the detailed processing steps of the target terminal location reception processing S14 illustrated in FIG. 10.

This reception processing is repeatedly executed until end processing is detected by the user's instructions or the like in end processing S141. In the event that there have been end instructions, this processing is ended.

In target terminal location reception completion confirmation processing S142, determination is made whether or not reception of the current location thereof from the target terminal has been completed. In the event that there has been no response from the wireless network for a predetermined period of time, the processing unit 10 may determine that time has run out, and end this processing.

In target terminal location saving processing S143, the processing unit 10 saves the received current location of the target terminal in the memory.

Figure 13:
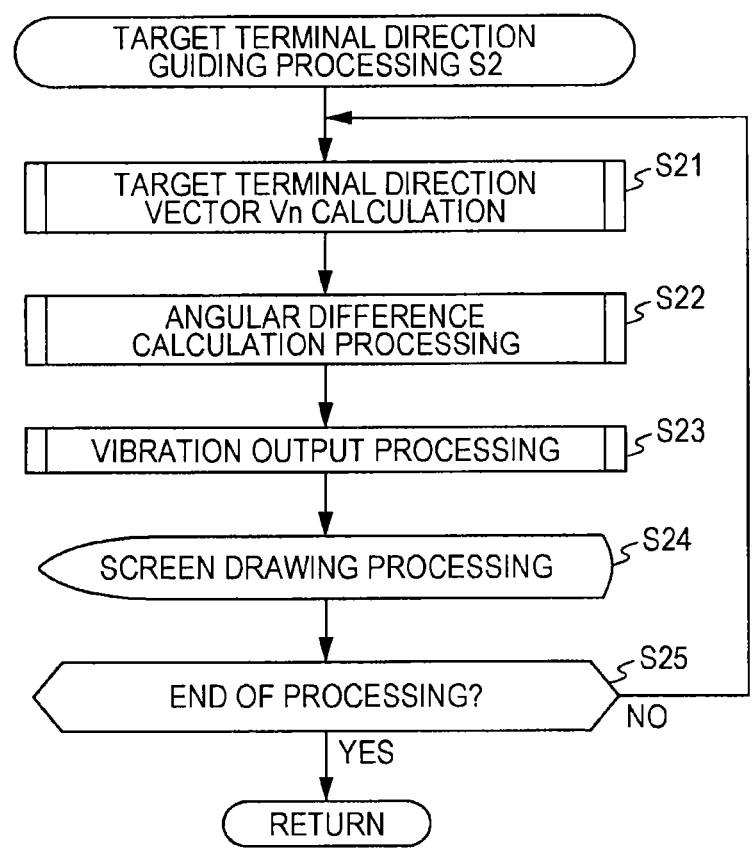
FIG. 13 is a flowchart illustrating an example of detailed processing steps of the target terminal direction guiding processing S2 illustrated in FIG. 9.

FIG. 13 is a flowchart illustrating an example of the detailed processing steps of the target terminal direction guiding processing S2 illustrated in FIG. 9.

In this target terminal direction guiding processing S2, the processing unit 10 first calculates the target terminal direction vector Vn in target terminal direction vector calculation processing S21.

Next, in angular difference calculation processing S22, the processing unit 10 calculates the angle $\theta$ that is angular difference between the own terminal direction Vd representing the facing direction of the terminal (direction of the tip), and the target terminal direction vector Vn.

Next, in vibration output processing S23, the processing unit 10 controls the four vibration elements 70a through 70d based on the angle $\theta$ calculated in the angular difference calculation processing S22.

In image drawing processing S24, an indicator such as a compass indicting the target terminal direction as described above, or the like can be displayed during target terminal search according to need.

In end processing S25, the processing unit 10 determines whether or not end processing according to the user's instructions or the like can be performed. In the event that the processing has to be ended, the processing unit 10 ends this processing.

Figure 14:
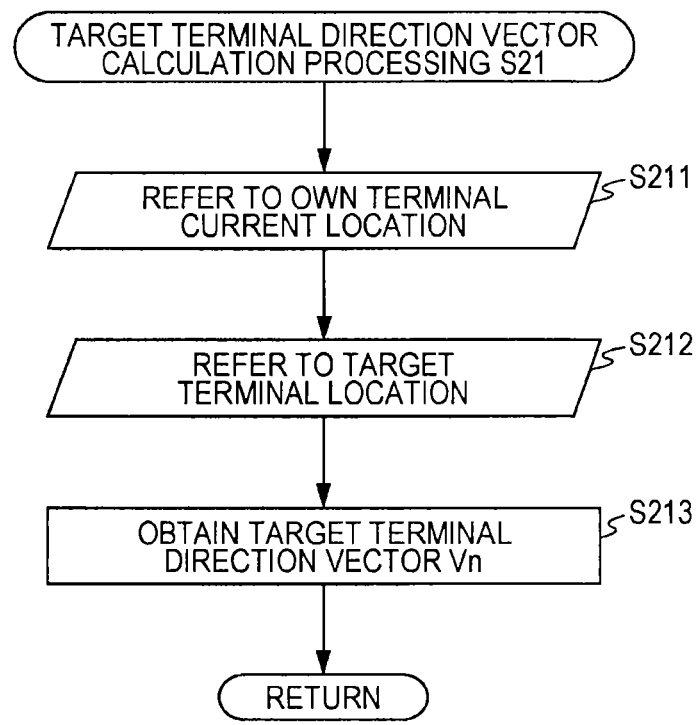
FIG. 14 is a flowchart illustrating an example of detailed processing steps of the target terminal direction vector calculation processing S21 illustrated in FIG. 13.

FIG. 14 is a flowchart illustrating an example of the detailed processing steps of the target terminal direction vector calculation processing S21 illustrated in FIG. 13.

First, in own terminal current location reference S211, the processing unit 10 references the current location of the own terminal previously saved in the own terminal current location saving processing S133.

Next, in target terminal location reference 5212, the processing unit 10 references the current location of the target terminal previously saved in the target terminal location saving processing S143.

Based on these reference results, the processing unit 10 obtains the target terminal direction vector Vn (S213). In this processing S213, the processing unit 10 obtains the target terminal direction vector Vn from difference between the current location (of latitude and longitude) of the own terminal, and the current location (of latitude and longitude) of the target terminal.

Figure 15:
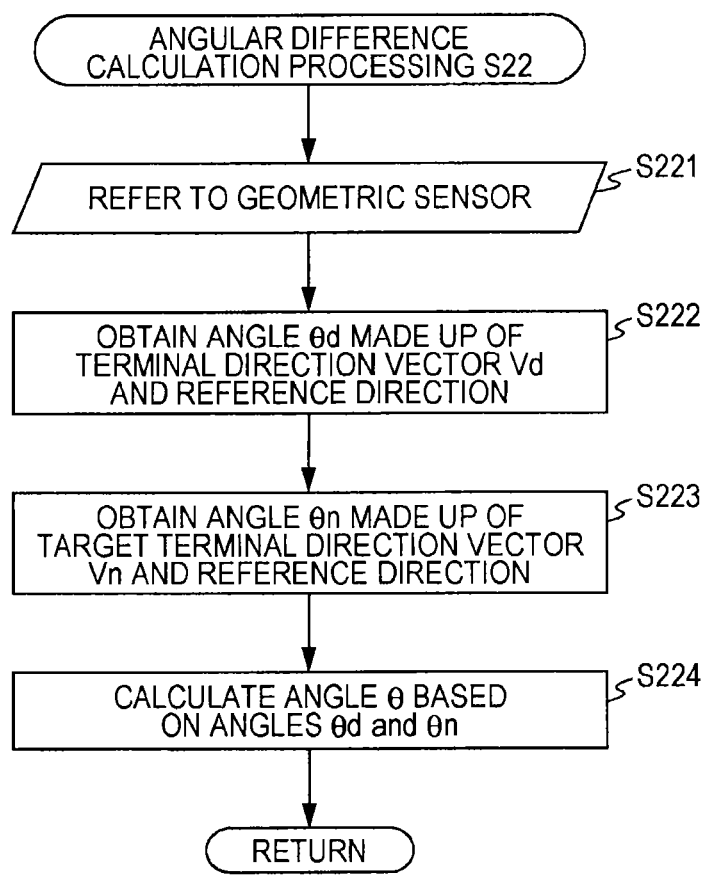
FIG. 15 is a flowchart illustrating an example of detailed processing steps of the angular difference calculation processing S22 illustrated in FIG. 13.

FIG. 15 is a flowchart illustrating an example of the detailed processing steps of the angular difference calculation processing S22 illustrated in FIG. 13.

First, in geomagnetic sensor reference processing 5221, the processing unit 10 detects the own terminal direction Vd representing the facing direction (the direction of the tip) of the terminal with reference to the geomagnetic sensor 31.

Next, the processing unit 10 obtains an angle θd that the own terminal direction Vd makes up with a reference direction (S222). The reference direction in this case is the longitudinal direction.

Next, the processing unit 10 obtains an angle θn that the target terminal direction vector Vn makes up with a reference direction (S223). The reference direction in this case is also the longitudinal direction.

Consequently, the processing unit 10 calculates an angle θ as difference between both angles based on the angles θd and θn (S224).

Figure 16:
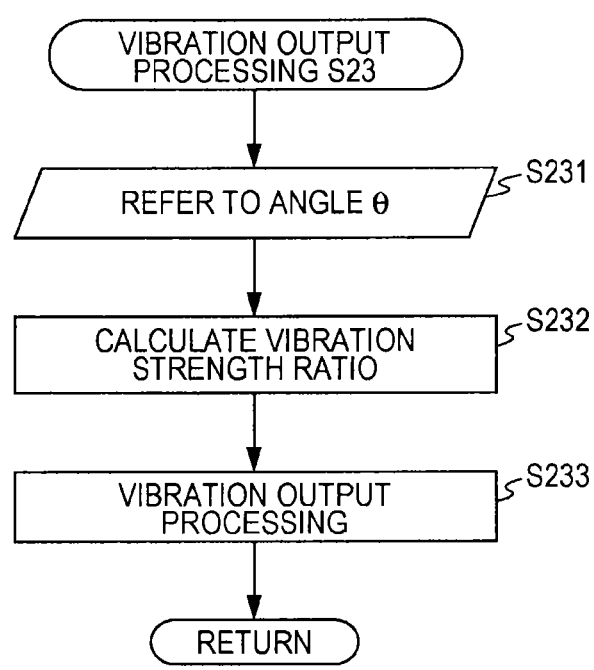
FIG. 16 is a flowchart illustrating an example of detailed processing steps of the vibration output processing S23 illustrated in FIG. 13.

FIG. 16 is a flowchart illustrating an example of the detailed processing steps of the vibration output processing S23 illustrated in FIG. 13.

With vibration output processing S23, first, in angle θ reference processing 5231, the processing unit 10 references the angle θ calculated in the processing S23 based on the angles θd and θn.

Next, the processing unit 10 calculates the vibration strength ratios of the four vibration elements 70a through 70d from this angle θ using Expression (1) (S232).

In vibration output S233, first, the processing unit 10 multiplies the unit vibration strength of the vibration elements by the vibration strength ratios calculated in step S232 to calculate the vibration strengths of the four vibration elements. Next, the processing unit 10 individually controls the four vibration elements based on these calculated vibration strengths.

Figure 17:
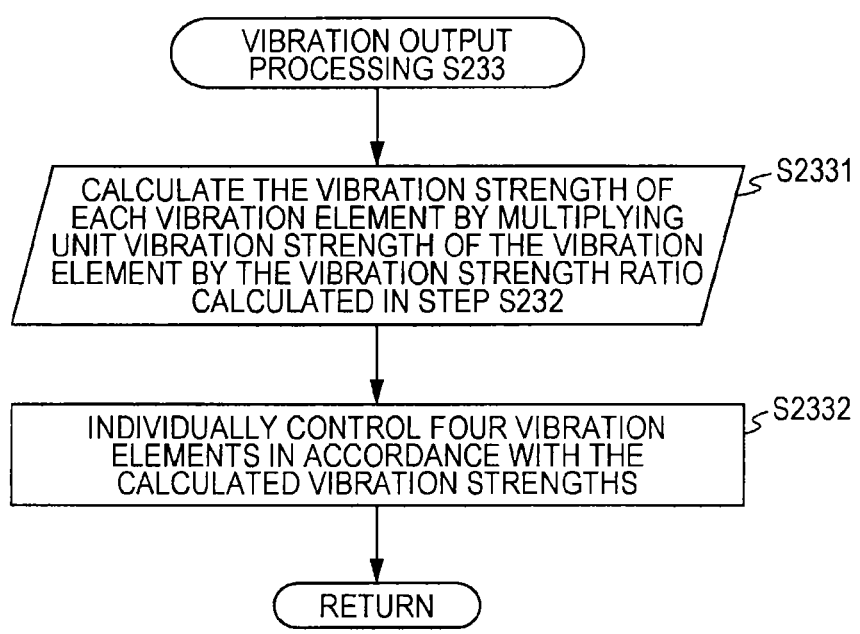
FIG. 17 is a flowchart illustrating an example of detailed processing steps of the vibration output processing S233 illustrated in FIG. 16.

FIG. 17 is a flowchart illustrating an example of the detailed processing steps of the vibration output processing S233 illustrated in FIG. 16.

In the vibration output processing S233, the processing unit 10 individually controls the four vibration elements 70a through 70d in accordance with the vibration strength ratios calculated in the previous step S232 (S2332).

Figure 18:
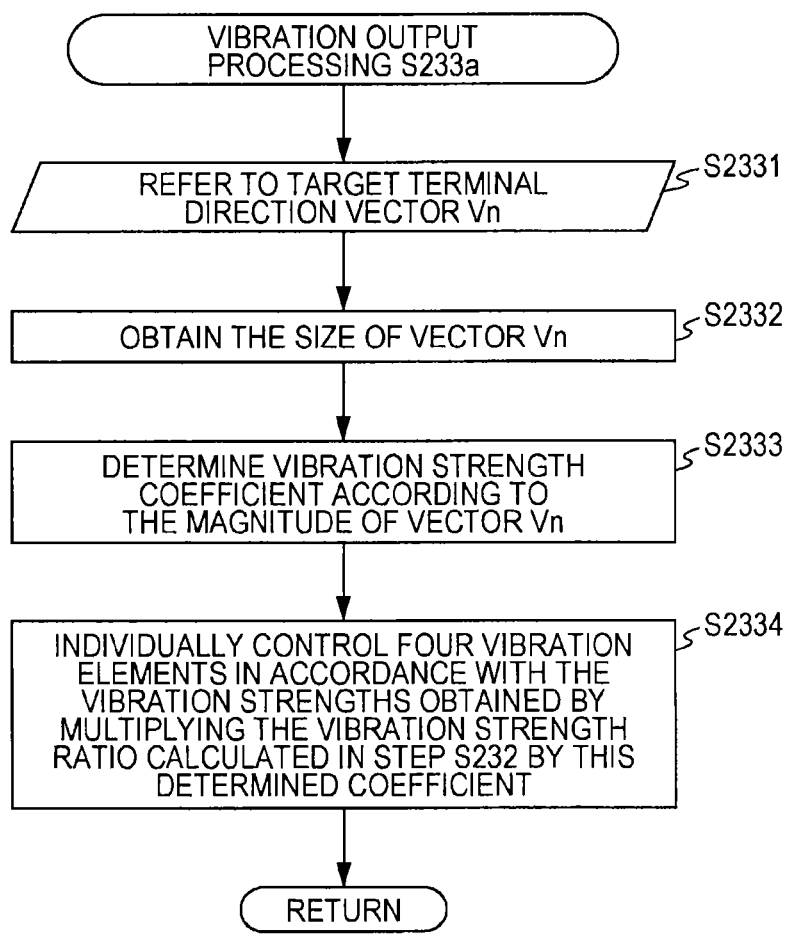
FIG. 18 is a flowchart illustrating an example of detailed processing steps of vibration output processing S233a serving as a modification of the processing illustrated in FIG. 17.

FIG. 18 is a flowchart illustrating an example of the detailed processing steps of vibration output processing S233a serving as a modification of the processing illustrated in FIG. 17. This modification corresponds to the configuration of the personal digital assistant illustrated in later-described FIG. 19.

In the vibration output processing S233a in FIG. 18, first, the processing unit 10 references the target terminal direction vector Vn (S2331), and then obtains the magnitude of this vector Vn (S2332). Next, the processing unit 10 determines a vibration strength coefficient to be commonly provided to the four vibration elements 70a through 70d according to the magnitude of this vector Vn (S2333).

Finally, the processing unit 10 individually controls the four vibration elements 70a through 70d in accordance with the vibration strengths obtained by multiplying the vibration strength ratios previously calculated in step S232 by this determined vibration strength coefficient (S2334).

As described above, the common coefficient to be multiplied as to the values of the v1(θ) through v4(θ) in Expression (1) is changed according to the magnitude of the vector Vn, whereby the strength of the entire vibration PS itself can be changed. Thus, not only the target terminal direction but also distance to the target terminal can also be presented to the user using the vibration PS. Modifications of vibration strengths according to distance include an example wherein the closer distance to the target terminal is, the greater the coefficient is increased to increase the vibration strengths.

Figure 19:
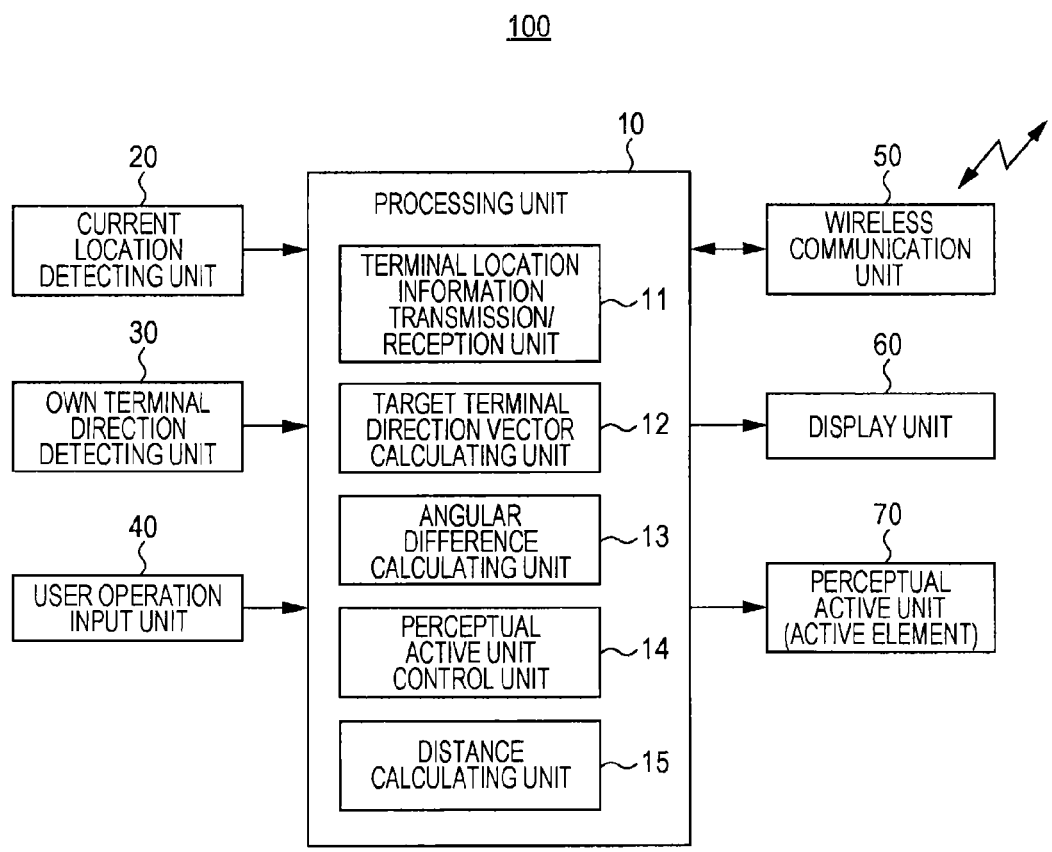
FIG. 19 is a block diagram illustrating a modification of the configuration in FIG. 1.

FIG. 19 illustrates a modification of the configuration in FIG. 1. The same components as those illustrated in FIG. 1 are denoted with the same reference numerals, and redundant description will be omitted. With the configuration in FIG. 19, a distance calculating unit 15 is provided within the processing unit 10. The distance calculating unit 15 calculates, based on the current location of the own terminal, and the current location of the target terminal, linear distance between both. In this case, the perceptual active unit control unit 14 may modulates the particular parameters of the four active elements based on the calculated distance. Examples of such a parameter include the vibration frequency of an active element.

Figure 20:
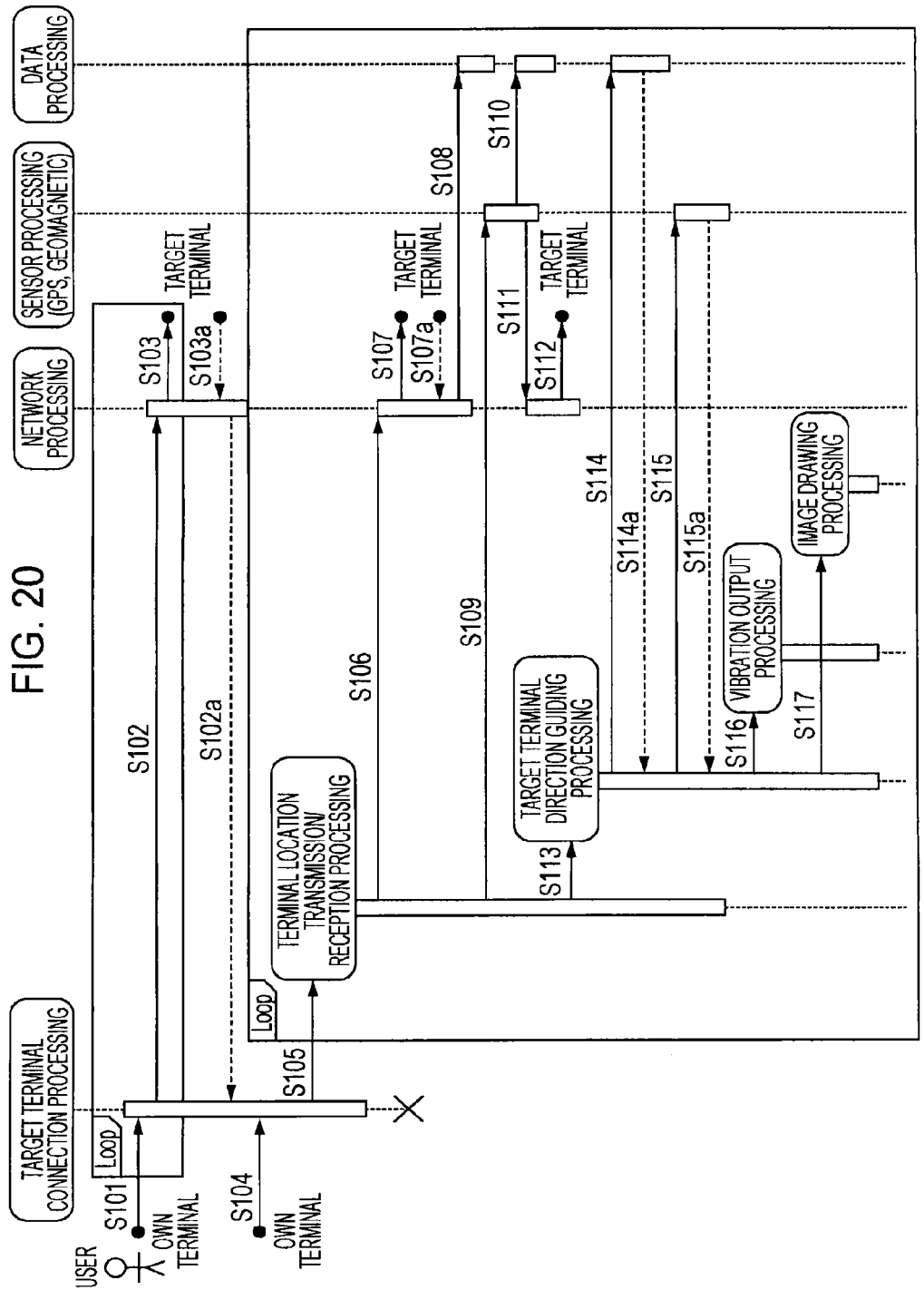
FIG. 20 is a software sequence chart representing a relation between various processes of a personal digital assistant according to an embodiment of the present disclosure, and a target terminal.

FIG. 20 illustrates a software sequence chart representing a relation between various processes of the personal digital assistant according to the present embodiment (including a modification) and the target terminal.

In step S101, target terminal connection processing is started according to a start operation by the user as premises for the target terminal search mode.

In response to this, in step S102 a connection request is issued to the target terminal via the wireless network. The processing unit 10 repeatedly issues a connection request to the target terminal until a response is obtained as to this connection request with the response from the target terminal as a return value (S103). In the event that no response has been obtained from the target terminal, determination may be made that time has run out, so as to end this processing. Also, here, the processing unit 10 also performs processing for waiting the connection request from the target terminal at the same time.

In the event that there has been received the connection request from the target terminal, the processing unit 10 returns a response (S102a), and escapes from the loop of wireless network processing. At the time of connecting the terminals, the current connection situation may be displayed on the screen such as under connection, connection completion, or the like. At the time of connecting the terminals, this processing is started at both of the own terminal of the user and the target terminal. Therefore, for example, an operation can be performed such that the partner terminal holder is prompted to start of the processing beforehand by communication such as E-mail or the like.

In step S104, terminal search processing is started according to a start operation by the user. Here, an example is illustrated wherein the user performs this operation after confirming connection to the target terminal. Instead of this, connection processing and terminal search processing with the target terminal may continuously be performed according to the start operation in the target terminal search mode.

In step S105, terminal location transmission/reception processing is started according to the start operation of the terminal search processing by the user, and the target terminal connection processing is ended. Processing thereafter is consecutively executed by loop until the end processing by the user is performed.

In step S106, the processing unit 10 requests transmission of the current location of the target terminal as to the target terminal as network processing (S107).

In response to this request, the target terminal takes the current location thereof as a return value (S107a). In the event that no response has been obtained from the target terminal, the processing unit 10 may determine that time has run out, and interrupt the present processing. At this time, with the subsequent calculation for the direction of the target terminal, the location of the target terminal obtained immediately before is used.

With the network processing, the processing unit 10 requests "data processing" to save the current location of the target terminal in the memory (S108).

With terminal location transmission/reception processing, the processing unit 10 requests "sensor processing" to obtain the current location of the personal digital assistant which the user possesses from the GPS reception unit 21 (S109). The obtained current location of the user's personal digital assistant is saved in the memory by "data processing" (S110).

After "sensor processing", the processing unit 10 requests the network processing (S111) to transmit the current location of the user's personal digital assistant to the target terminal (S112).

With terminal location transmission/reception processing, thereafter, the processing unit 10 starts target terminal direction guiding processing (S113).

With the target terminal direction guiding processing, first, the processing unit 10 requests "data processing" (S114) to obtain the current location of the target terminal, and the current location of the user's personal digital assistant saved immediately before from the memory (S114a).

Next, the processing unit 10 requests "sensor processing" (S115) to obtain the own terminal direction of the user's personal digital assistant from the geomagnetic sensor 31 (S115a). Further, the processing unit 10 starts vibration output processing (S116). Specifically, the processing unit 10 calculates the vibration strengths of the four vibration elements from the current locations of both terminals to drive the vibration elements.

Further, the processing unit 10 starts screen drawing processing such as described above (S117).

The operation illustrated in FIG. 20 illustrates only one-way operation wherein the target terminal is searched from the user's personal digital assistant. In parallel with this operation, the same operation may be performed wherein the user's personal digital assistant is searched from the target terminal side as well.

With the above vibration output processing, though an example has been described wherein the vibration strengths of all of the vibration elements are commonly changed, the vibration frequencies of all of the vibration elements may commonly be changed depending on situations. For example, in the same way as described above, the vibration frequencies may be changed according to the magnitude of the vector Vn.

Modifications of the vibration frequencies include an example wherein the closer the distance is, the lower the frequencies are set. A vibration intermittent frequency is the frequency of a repeated cycle made up of vibration time and stop time. Specifically, in the event of repeating an intermittent pattern of n-second (e.g., 0.5-second) stop after m-second (e.g., 0.5-second) vibration, (m+n) seconds are an intermittent frequency. Modifications of vibration intermittent frequencies according to distance include an example wherein the closer the distance to the target terminal is, the lower the intermittent frequencies are decreased.

Change of an intermittent pattern means to employ a different pattern of a combination between the above vibration period and stop period lengths by switching. Modifications of an intermittent pattern according to distance include a pattern wherein the closer the distance is, the tenser sensitivity is given to the user.

Figure 21:
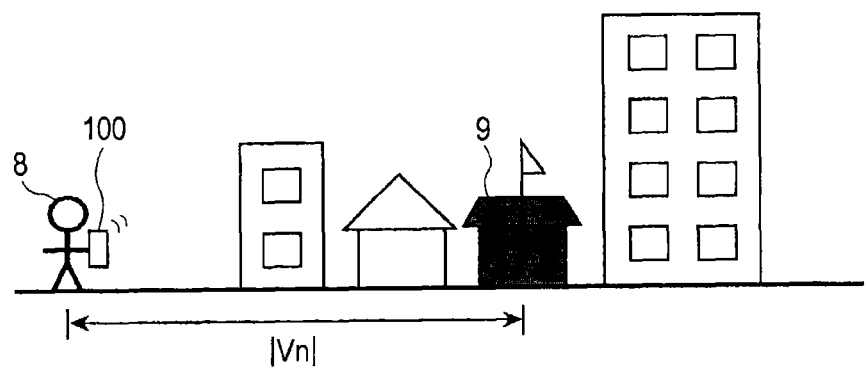
FIG. 21 is a diagram for describing an application of an embodiment of the present disclosure.

Note that, though description has been made regarding a case where in the target terminal search mode of the personal digital assistant according to the above embodiment, the target terminal is a portable terminal (moving terminal), the target terminal may be a fixed terminal (non-moving terminal). FIG. 21 illustrates such an application. The search target 9 in this case is, for example, a recommended store, or the like, and the target terminal is a terminal fixedly installed therein. For example, a service provider of a store or the like informs the location information (latitude and longitude) of this store to a terminal 100 which a user 8 possesses using an E-mail or the like. The personal digital assistant of the user 8 sets the store thereof as the target terminal based on this notification.

With this application, the vibration PS within the palm of the user 8 moves to the direction of the store thereof, whereby the user can intuitively and safely be guided to the store. At this time, presentation of the vibration PS may be started since the terminal 100 entered within certain distance from the store using distance "Vn" from the terminal 100 to the search target 9. The above distance display is also effective for this example.

Additionally, an embodiment of the present disclosure may be applied to monitoring of a person to be monitored such as a child or the like in usage such as prevention of a missing child. With a monitoring mode, at a terminal which a person to be monitored such as a child possesses, it may be set by initial setting to automatically respond to in the case of a connection request has been received from a partner's terminal. In this case, the child's terminal does not necessarily have to transmit the location information of the own terminal. Also, with such a monitoring mode, control may be performed such that presentation of the vibration PS is suppressed until the magnitude of the vector Vn exceeds a predetermined threshold, and presentation of the vibration PS is started when exceeding the predetermined threshold.

As described above, according to the present embodiment, the user is intuitively allowed to recognize the direction of the rendezvous partner, and also the user can directly be guided to the direction of the rendezvous partner. Thus, reduction in time and trouble until the user meets the rendezvous partner can be expected. Further, an embodiment employing vibration tactile perception prevents the user from depending on visual perception information. Thus, terminal search can be realized in a smooth and safe manner.

With the above embodiment of the present disclosure, description has been made regarding (1) an information processing apparatus comprising:

a casing;

a location detecting unit that detects a first location of the information processing apparatus;

a communication interface that receives information representing a target location from a target information processing apparatus;

a processor that detects a target direction from the first location toward the target location;

a detector that detects an orientation of the casing;

a perceptual active unit including a plurality of active elements disposed in different locations on or within the casing, wherein the processor calculates an angular difference between the target direction and the orientation of the casing, determines a perceptual strength of each of the plurality of active elements based on the angular difference, and controls each of the plurality of active elements based on the perceptual strengths.

(2) The information processing apparatus of (1), wherein the location detecting unit continuously updates the first location of the information processing apparatus by detecting the position of the information processing apparatus at first predetermined time intervals.

(3) The information processing apparatus of (2), wherein the processor continuously updates the target direction based on the continuously updated first location of the information processing apparatus by the location detecting unit.

(4) The information processing apparatus of (3), wherein
the detector continuously updates the orientation of the casing by detecting the orientation of the casing at second predetermined time intervals.

(5) The information processing apparatus of (4), wherein
the processor continuously updates the angular difference between the target direction and the orientation of the casing based on the continuously updated orientation of the casing detected by the detector.

(6) The information processing apparatus of (5), wherein
the processor continuously determines the perceptual strength of each of the plurality of active elements based on the updated angular difference, and controls each of the plurality of active elements based on the perceptual strengths.

(7) The information processing apparatus of any of (1) to (6), wherein
the processor controls the communication interface to transmit the first location of the information processing apparatus to the target information processing apparatus.

(8) The information processing apparatus of any of (2) to (7), wherein
the processor controls the communication interface to transmit the continuously updated the first location of the information processing apparatus to the target information processing apparatus.

(9) The information processing apparatus of any of (1) to (8), wherein
the processor calculates a distance from the first information processing apparatus to the target information processing apparatus based on the first location information and the target location.

(10) The information processing apparatus of (9), further comprising:
a display, wherein
the processor controls the display to display a numeric value representing the calculated distance.

(11) The information processing apparatus of any of (1) to (10), further comprising:
a display, wherein
the processor controls the display to display a graphic indicator representing the target direction.

(12) The information processing apparatus of (11), wherein
the graphic indicator is an arrow pointing in the target direction.

(13) The information processing apparatus of (12), wherein
the processor calculates a distance from the first information processing apparatus to the target information processing apparatus based on the first location information and the target location, and controls a length of the arrow displayed on the display based on the calculated distance.

(14) The information processing apparatus of any of (1) to (13), wherein
the plurality of active elements are at least one of vibration elements, heating elements, contraction elements, and electrical stimulation elements.

(15) The information processing apparatus of any of (1) to (14), wherein
the perceptual active element includes at least three active elements disposed in different locations on or within the casing.

(16) The information processing apparatus of (9), wherein
the plurality of active elements are vibration elements, and the processor controls the plurality of active elements to be active only when the calculated distance is greater than a predetermined threshold.

(17) The information processing apparatus of claim 9, wherein
the plurality of active elements are vibration elements, and the processor controls the plurality of active elements by changing a vibration frequency of each of the plurality of active elements based on the calculated distance.

(18) An information processing method performed by an information processing apparatus, the method comprising:
detecting a first location of the information processing apparatus;
receiving information representing a target location from a target information processing apparatus;
detecting a target direction from the first location toward the target location;
detecting an orientation of a casing of the information processing apparatus;
calculating an angular difference between the target direction and the orientation of the casing;
determining a perceptual strength of each of a plurality of active elements disposed in different locations on or within the casing based on the angular difference; and
controlling each of the plurality of active elements based on the perceptual strengths.

(19) A non-transitory computer-readable medium including computer program instructions, which when executed by an information processing apparatus, cause the information processing apparatus to perform a method comprising:
detecting a first location of the information processing apparatus;
receiving information representing a target location from a target information processing apparatus;
detecting a target direction from the first location toward the target location;
detecting an orientation of a casing of the information processing apparatus;
calculating an angular difference between the target direction and the orientation of the casing;
determining a perceptual strength of each of a plurality of active elements disposed in different locations on or within the casing based on the angular difference; and
controlling each of the plurality of active elements based on the perceptual strengths.

Though description has been made so far regarding the suitable embodiment of the present disclosure, various modifications and changes other than the above mentioned can be made. Specifically, it is apparent that one skilled in the art can conceive various modifications, combinations, and other embodiments due to a design or other elements within the scope of the Claims of the present disclosure or equivalent to the Claims.

For example, though description has been made regarding the personal digital assistant performing control of the vibration PS according to four-point vibration according to the four vibration elements, control of the vibration PS according to a number of vibrations other than four points can be performed by changing a vibration strength ratio calculating algorithm (formula). For example, in the case of 3-point vibration, there are restrictions such as difficulty of control of the vibration PS due to that there are a few vibrators, and difficulty of effective vibrator layout in terms of a functional aspect and a design aspect. However, the vibrators are disposed in a triangle shape, and the vibration strength control algorithm is adjusted, whereby the direction of the target terminal can be presented by presenting the vibration PS above a 2D plane in the same way as with a case of employing 4-point vibration, though precision and effective aspects somewhat deteriorate.

Though description has been made regarding the vibration elements as an example of the active elements of the perceptual active unit, the vibration elements may be replaced or reinforced with other active elements such as heating elements, contraction elements, or electrical stimulation elements whereby the level of sense to be perceived can be controlled. The heating elements are sensitive to an electric current to generate heat in a scattered manner so as to instruct the user a particular direction. For example, the user can perceive that two elements substantially generate more heat than other two elements. The ratio of the amount of heat perceived from these elements is a perceptual clue for the user regarding the direction of the target terminal direction vector Vn. As another example, the target terminal direction vector Vn may be perceived by the user who put on gloves including pressure restrictive transducers, or other clothing accessories. The pressure restrictive transducers in this case squeeze or tingle the fingers or wrists or the like as a perceptual clue as to the target guiding direction. For example, in the event of employing gloves described in U.S. Pat. No. 5,067,478 (the entire contents thereof are encompassed in the present application by reference), the gloves can readily be used for assisting the present function.

Though display of map information is not essential, map information indicating the current terminal location and the target terminal location is not prevented from being displayed on the display screen of a personal digital assistant. The edge portion of an arrow representing the target terminal direction can be positioned in the current location on the map.

A computer program for realizing the functions described in the above embodiment at a computer, and a recording medium which stores the program in a computer-readable manner are also encompassed in the present disclosure. Examples of "recording medium" for supplying the program include magnetic storage media (flexible disks, hard disks, magnetic tapes, etc.), optical discs (magneto-optical disk such as MO or PD or the like, CD, DVD, etc.), and semiconductor storages.

The invention claimed is:

1. An information processing apparatus comprising:
   a casing;
   a plurality of active elements disposed in different locations on or within the casing, each of the plurality of active elements being configured to provide a sensory output to a user; and
   circuitry configured to
   detect a first location of the information processing apparatus;
   receive information representing a target location from a target information processing apparatus;
   detect a target direction from the first location toward the target location;
   detect an orientation of the casing;
   calculate an angular difference between the target direction and the orientation of the casing;
   determine an output strength of each of the plurality of active elements based on the angular difference; and
   control each of the plurality of active elements based on the output strengths to provide the sensory output to the user.

2. The information processing apparatus of claim 1, wherein
   the circuitry is configured to continuously update the first location of the information processing apparatus by detecting the position of the information processing apparatus at first predetermined time intervals.

3. The information processing apparatus of claim 2, wherein
   the circuitry is configured to continuously update the target direction based on the continuously updated first location of the information processing apparatus.

4. The information processing apparatus of claim 3, wherein
   the circuitry is configured to continuously update the orientation of the casing by detecting the orientation of the casing at second predetermined time intervals.

5. The information processing apparatus of claim 4, wherein
   the circuitry is configured to continuously update the angular difference between the target direction and the orientation of the casing based on the continuously updated orientation of the casing.

6. The information processing apparatus of claim 5, wherein
   the circuitry is configured to continuously determine the output strength of each of the plurality of active elements based on the updated angular difference, and to control each of the plurality of active elements based on the output strengths.

7. The information processing apparatus of claim 1, wherein
   the circuitry is configured to transmit the first location of the information processing apparatus to the target information processing apparatus.

8. The information processing apparatus of claim 2, wherein
   the circuitry is configured to transmit the continuously updated the first location of the information processing apparatus to the target information processing apparatus.

9. The information processing apparatus of claim 1, wherein
   the circuitry is configured to calculate a distance from the first information processing apparatus to the target information processing apparatus based on the first location information and the target location.

10. The information processing apparatus of claim 9, further comprising:
    a display, wherein
    the circuitry is configured to control the display to display a numeric value representing the calculated distance.

11. The information processing apparatus of claim 1, further comprising:
    a display, wherein
    the circuitry is configured to control the display to display a graphic indicator representing the target direction.

12. The information processing apparatus of claim 11, wherein
    the graphic indicator is an arrow pointing in the target direction.

13. The information processing apparatus of claim 12, wherein
    the circuitry is configured to calculate a distance from the first information processing apparatus to the target information processing apparatus based on the first location information and the target location, and to control a length of the arrow displayed on the display based on the calculated distance.

14. The information processing apparatus of claim 1, wherein
    the plurality of active elements are at least one of vibration elements, heating elements, contraction elements, and electrical stimulation elements.

15. The information processing apparatus of claim 1, wherein
the plurality of active elements include at least three active elements disposed in different locations on or within the casing.

16. The information processing apparatus of claim 9, wherein
the plurality of active elements are vibration elements, and the circuitry is configured to control the plurality of active elements to be active only when the calculated distance is greater than a predetermined threshold.

17. The information processing apparatus of claim 9, wherein
the plurality of active elements are vibration elements, and the circuitry is configured to control the plurality of active elements by changing a vibration frequency of each of the plurality of active elements based on the calculated distance.

18. An information processing method performed by an information processing apparatus, the method comprising:
receiving information representing a target location from a target information processing apparatus;
detecting a first location of the information processing apparatus;
detecting a target direction from the first location toward the target location;
detecting an orientation of a casing of the information processing apparatus;
calculating an angular difference between the target direction and the orientation of the casing;
determining an output strength of each of a plurality of active elements disposed in different locations on or within the casing based on the angular difference, said each of the plurality of active elements being configured to provide a sensory output to a user; and
controlling each of the plurality of active elements based on the output strengths to provide the sensory output to the user.

19. A non-transitory computer-readable medium including computer program instructions, which when executed by an information processing apparatus, cause the information processing apparatus to perform a method comprising:
detecting a first location of the information processing apparatus;
receiving information representing a target location from a target information processing apparatus;
detecting a target direction from the first location toward the target location;
detecting an orientation of a casing of the information processing apparatus;
calculating an angular difference between the target direction and the orientation of the casing;
determining an output strength of each of a plurality of active elements disposed in different locations on or within the casing based on the angular difference, said each of the plurality of active elements being configured to provide a sensory output to a user; and
controlling each of the plurality of active elements based on the output strengths to provide the sensory output to the user.

* * * * *